US010216846B2

(12) United States Patent
von Rickenbach et al.

(10) Patent No.: US 10,216,846 B2
(45) Date of Patent: Feb. 26, 2019

(54) COMBINATORIAL BUSINESS INTELLIGENCE

(71) Applicant: Thomson Reuters (GRC) LLC, New York, NY (US)

(72) Inventors: David von Rickenbach, Baar (CH); Mark Brusadelli, Zug (CH); David Harper, Berkley, MA (US); John Kelly, Orinda, CA (US); Marc Kukura, Oberwil b Zug (CH); Mans Olof-Ors, Zug (CH)

(73) Assignee: Thomson Reuters (GRC) LLC, New York, NY (US)

( * ) Notice: Subject to any disclaimer, the term of this patent is extended or adjusted under 35 U.S.C. 154(b) by 353 days.

(21) Appl. No.: 14/918,128

(22) Filed: Oct. 20, 2015

(65) Prior Publication Data
US 2016/0117393 A1 Apr. 28, 2016

Related U.S. Application Data

(60) Provisional application No. 62/067,214, filed on Oct. 22, 2014.

(51) Int. Cl.
*G06F 17/30* (2006.01)
(52) U.S. Cl.
CPC .............. *G06F 17/30864* (2013.01)
(58) Field of Classification Search
None
See application file for complete search history.

(56) References Cited

U.S. PATENT DOCUMENTS

| 7,272,851 | B2* | 9/2007 | Gomez | G06F 17/30011 |
| | | | | 705/32 |
| 7,403,932 | B2* | 7/2008 | Kao | G06F 17/30719 |
| | | | | 706/45 |
| 8,402,035 | B2* | 3/2013 | Artzt | G06F 17/3053 |
| | | | | 707/709 |
| 9,424,233 | B2* | 8/2016 | Barve | G06F 17/30522 |
| 2004/0216058 | A1* | 10/2004 | Chavers | G06F 3/0481 |
| | | | | 715/810 |
| 2006/0059440 | A1* | 3/2006 | Pry | G06F 17/30864 |
| | | | | 715/838 |
| 2007/0168859 | A1* | 7/2007 | Fortes | G06F 17/211 |
| | | | | 715/700 |

(Continued)

*Primary Examiner* — Hung D Le
(74) *Attorney, Agent, or Firm* — McCarter & English, LLP

(57) ABSTRACT

Exemplary embodiments of the present disclosure relate to systems and methods for providing information about a sector and geographic focus of a company and enables user to identify the top product/brands of a company. Trademark records can be leveraged and combined with other sources of data, which can be presented to a user in an integrated graphical user interface, to facilitate combinatorial business intelligence for one or more companies. Analytical data associated with trademark records corresponding to the company included in the search can be generated to provide a ranked list of trademarked names/brands for the company and a combined or integrated view can be generated in a graphical user interface that includes the ranked list of the trademarked names/brands for the company and also includes the recent news or other information related to the trademark names/brands.

20 Claims, 12 Drawing Sheets

(56) References Cited

U.S. PATENT DOCUMENTS

| | | | |
|---|---|---|---|
| 2008/0312940 A1* | 12/2008 | Marlett | G06Q 50/184 705/310 |
| 2011/0047035 A1* | 2/2011 | Gidwani | G06Q 30/02 705/14.73 |
| 2011/0047166 A1* | 2/2011 | Stading | G06F 17/30637 707/749 |
| 2012/0084281 A1* | 4/2012 | Colosi | H04L 29/12632 707/723 |
| 2014/0289675 A1* | 9/2014 | Stading | G06F 3/0482 715/810 |
| 2015/0081440 A1* | 3/2015 | Blemaster | G06Q 30/0256 705/14.54 |
| 2016/0103917 A1* | 4/2016 | Talmor | G06Q 10/067 707/738 |
| 2017/0116314 A1* | 4/2017 | Aoun | G06F 17/30598 |

* cited by examiner

COMBINATORIAL BUSINESS INTELLIGENCE

RELATED APPLICATIONS

The present application claims priority to U.S. Provisional Patent Application Ser. No. 62/067,214, filed on Oct. 22, 2014, the disclosure of which is incorporated by reference herein in its entirety.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever.

BACKGROUND

An overwhelming amount of data has been made available in electronic form with more and more content being made available daily. Often such data is organized, indexed, and/or tagged to help users search for specific data of interest. For example, some search engines use bots or web crawlers to create an index of webpages. Similarly, databases, proprietary or otherwise, can be created to store data. Data indexed by web crawlers or stored in databases can be separately searched, accessed, and viewed over the Internet using applications (e.g., web browsers and proprietary applications) and/or via application-program interfaces (APIs). Generally, databases tend to be organized in a domain-specific manner and include like content stored in like formats, each requiring their own querying language, structure, and/or format, often resulting in data silos. Thus, while more and more data is being made available in electronic form, it can be difficult for users searching for data to identify and analyze data across disparate data sources that can be leveraged to generate valuable and/or meaningfully insights related to the subject of the search.

SUMMARY

Exemplary embodiments of the present disclosure advantageously address problems associated with data searching in networked environments wherein vast amounts of data are stored in disparate data sources. Exemplary systems, methods, and computer-readable media are described herein that overcome the effect of data silos attributed to data sources (e.g., domain-specific data sources) in networked environments and provides an integrated graphical user interface for viewing, supplementing, and/or suggesting different sets of data retrieved from different disparate data sources.

Exemplary embodiments of the present disclosure advantageously provide for an application that allows users to research a specific company based on information in trademark records. As one example, the application can provide information about the sector and geographic focus of a company and enables users to identify the top product/brands of a company. Trademark records in a trademark database can include a rich set of data that can provide information about a company and/or its trademarked names/brands that can be leveraged and combined with other sources of data, which can be presented to a user in an integrated graphical user interface, to facilitate combinatorial business intelligence for one or more companies. For example, trademark records in a trademark database can include information, such as sector classification, filing country, history, status, owner affiliates (legal company that files/filed for the trademark), goods/services information (e.g., describing the purpose of the trademark), and the like. Companies typically file/register trademarks on the company name, the product names, slogans, logos, and the like, early to protect the names and brands. Exemplary embodiments of the present disclosure provide for data and/or text searchable trademark records, which are made accessible to users. Trademark owner information in the trademark records can be mapped to and/or matched against one or more hierarchical organization data structures to identify and/or obtain an ultimate parent organization for the trademark owner.

In accordance with embodiments of the present disclosure, a combined view in a graphical user interface showing the most important trademarked names/brands for a given company and recent news articles associated with the trademarked names/brands can be provided. The combined view can include a search box that allows a user to submit a query company. In response to submission of the query through the search box, embodiments can return a ranked list of the most important trademarked names/brands owned by the query company and can return recent news for the trademarked names/brands in the ranked list. For example, the graphical user interface can allow a user to choose a trademark name/brand from the ranked list of most important trademarked names/brands, and embodiments retrieve and/or display recent news related to the chosen trademark name/brand in the combined view.

In accordance with embodiments of the present disclosure, a computer-implemented method is disclosed that includes receiving, at a server, a query pertaining to an entity from a user device, determining an entity identifier associated with the entity using an entity database server, and obtaining from a database a ranked list of selected trademark names in response to a query including the entity identifier. The method also includes generating, using a news database server, a first set of links to a first set of news articles associated with at least one of the trademark names in the ranked list and presenting the ranked list of selected trademark names and the first set of links to the first set of news articles associated with the at least one trademark name on a display device through a graphical user interface.

In accordance with embodiments, a system is disclosed that includes a first database server, a news database server, and an entity database server. The first database server stores analytical data associated with trademark records, the news database server stores new articles, and the entity database server stores entity identifiers. The first database server receives a query from a user device pertaining to an entity, interacts with the entity database server to determine an entity identifier associated with the entity, and obtains, from the first database server, a ranked list of selected trademark names in response to the a query including the entity identifier. The news database server generates a first set of links to a first set of news articles associated with at least one of the trademark names in the ranked list. The ranked list of selected trademark names and the first set of links to the first set of news articles associated with the at least one trademark name are transmitted to and displayed by a user device through a graphical user interface.

In accordance with embodiments of the present disclosure, the ranked list can be presented in a first display area of the graphical user interface and the first set of links to the news articles can be presented in a second display area of the graphical user interface.

In accordance with embodiments of the present disclosure, generation of the first set of links to a first set of news articles associated with at least one of the trademark names in the ranked list is performed in response to an auto-generated query including a highest ranking one of the trademark names in the ranked list.

In accordance with embodiments of the present disclosure, selection of one of the links in the first set of links causes the new article to be rendered on the display.

In accordance with embodiments of the present disclosure, selectable links can be generated for the trademark names in the ranked list, and in response to selection of one of the selectable links, a second set of links associated with a second set of news articles can be generated using the news database server. The second set of links can replace the first set of links being rendered on the display device through the graphical user interface.

In accordance with embodiments of the present disclosure, the entity identifier can be further associated with an entity top level organizational identifier using an organizational hierarchy database.

In accordance with embodiments of the present disclosure a system and method of searching disparate data sources in a networked environment is disclosed. The method includes retrieving, via a communications network, analytical data for a first set of data records from a first data source based on a query including a unique identifier derived from a search term in a search request, identifying at least one data element in the first set from which the analytical data is generated, and generating, via the communications network or another communications network, links to a second set of data records from a second data source based on a query including the at least one data element, the first and second data sources being disparate sources. The method also includes rendering the analytical data for the first set of data records from the first data source in a first display area of a displayed graphical user interface and rendering the links to the second set of data records from the second data source in a second display area of the displayed graphical user interface.

In accordance with embodiments of the present disclosure, at least one data element can be identified by identifying a plurality of data elements in the first set from which the analytical data is generated.

In accordance with embodiments of the present disclosure, selectable links for each plurality of data elements can be generated, and in response to selection of one of the selectable links, a query including one of the plurality of data elements can be generated. Links to a third set of data records from the second data source can be generated based on a response to the query by the second data source, and the links to the second set data records in the second display area can be replaced with the links to the third set of data records.

In accordance with embodiments of the present disclosure, the analytical data corresponds to a ranked list of data elements included in the first set of data records.

In accordance with embodiments of the present disclosure, the first set of data records are associated with a first domain and the second set of data records are associated with a second domain.

In accordance with embodiments of the present disclosure, a system and method is disclosed that provides for installation and execution of a downloadable client-side application by a user device, where the downloadable client-side application can be downloaded over a communication network by the user device. In response to launching the client-side application on the user device, a graphical user interface can be rendered on a display of the user device. A search request including a search term can be transmitted by the user device over the communications network to a first server in communication with a first data source at the instruction of the client-side application, and the first server can query the first data source based on an identifier derived from the search term. Analytical data associated with a first set of data records stored by the first data source from the first server can be received by the user device. A query to a second server in communication with a second data source can be transmitted by the user device at the instruction of the client-side application. The query can include a data element from the first set of data records that was utilized to generate the analytical data. Links to a second set of data records can be received from the second server by the user device. The analytical data associated with the first set of data records and the links to the second set of data records can be simultaneously displayed in the graphical user interface rendered on the display of the user device.

In accordance with embodiments of the present disclosure, selectable links can be embedded in the analytical data.

In accordance with embodiments of the present disclosure, in response to selection of a first one of the links, the user device, at the instruction of the application, can transmit a further query to the second server. The further query can include a different data element included in the first set of data records which was utilized to generate the analytical data. The user device can receive links to a third set of data records from the second server in response to the further query, and the links to the second set of data records can be replaced with the links to the third set of data records in the graphical user interface.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying Figures. In the drawings, like reference numerals refer to like parts throughout the various views of the non-limiting and non-exhaustive embodiments.

FIGS. 5-6 illustrate an exemplary graphical user interface in accordance with embodiments of the present disclosure.

DETAILED DESCRIPTION

Figure 1A:
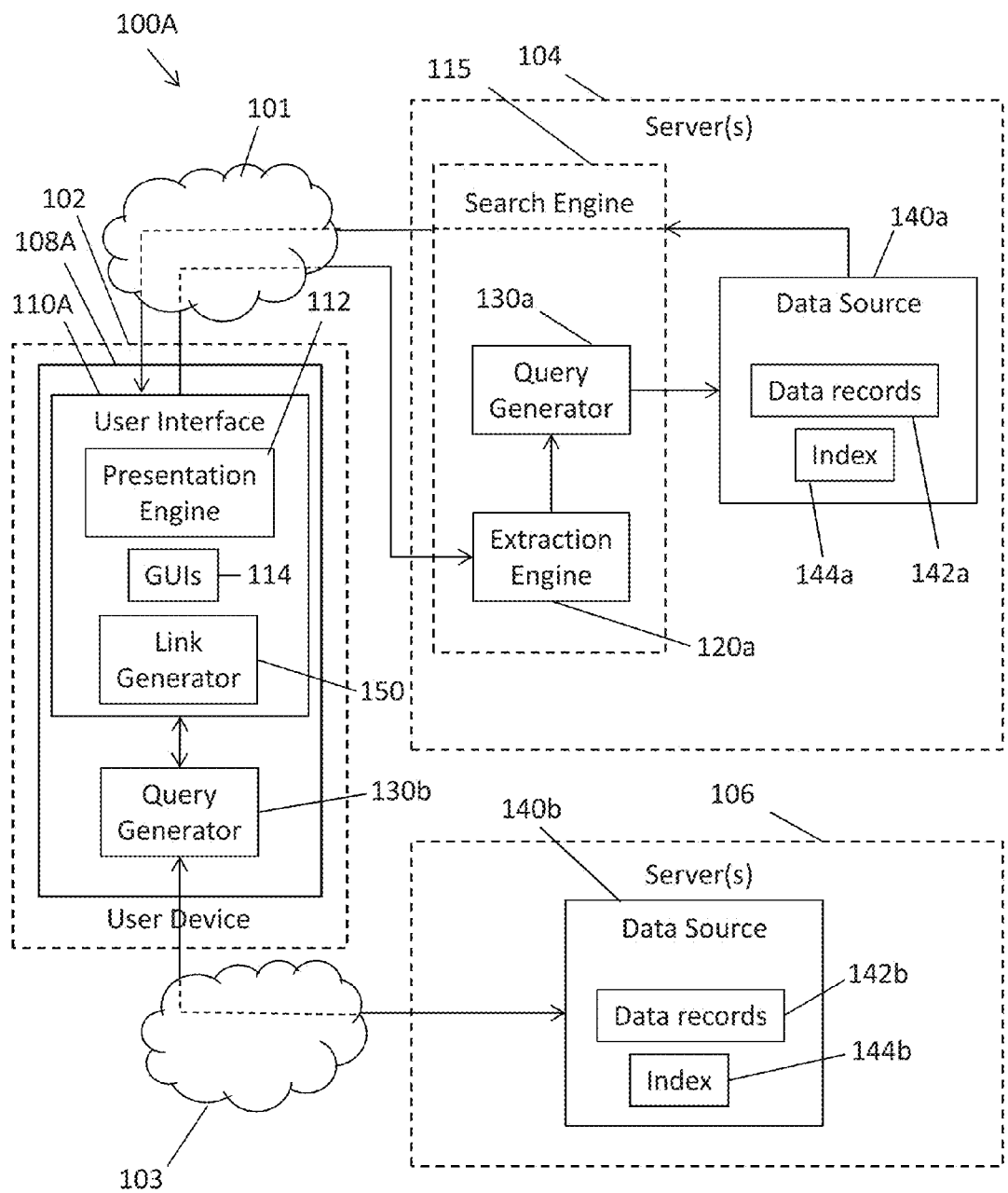
FIG. 1A-B are a block diagrams of exemplary environments for enhancing query and search processing in accordance with embodiments of the present disclosure.

Exemplary embodiments of the present disclosure relate to systems, methods, and non-transitory computer-readable media for enhanced data searching of disparate data sources via one or more communication networks. The enhanced data searching can provide for data ranking and data supplementing capabilities such that searching of a first data source results in data records (or links to data records) in other data sources being retrieved to supplement or suggest data beyond what is returned by the searched first data source. The searched first data source may provide analytical/statistical data, such as ranking data, related to the contents of the first data source in response to being searched, and the data records (or links to the data records) provided by the other data sources may be specific to the data elements from the data records in the first data source utilized to generate the analytical/statistical data.

In a non-limiting example application, exemplary embodiments of the present disclosure advantageously allow users to research a specific company based on information in trademark content. As one example, the application can provide information about the sector and geographic focus of a company and enables user to identify the top product/brands of a company. Trademark records in a trademark database can include a rich set of data that can provide information about a company and/or its trademarks/brands that can be leveraged and combined with other sources of data (e.g., a database storing news), which can be presented to a user in an integrated graphical user interface, to facilitate combinatorial business intelligence for one or more company. For example, a user can submit a search request that identifies a company of interest, and one or more servers can process the request to obtain an identifier associated with the name of the company included in the search. Using this identifier, the one or more servers can retrieve analytical data associated with trademark records corresponding to the company included in the search. The analytical data can include a ranked list of trademarked names/brands for the company, which can be returned to the user's device and which can be used to retrieve news or other data associated with the trademarked names/brands in the ranked list. A combined or integrated view can be generated in a graphical user interface that includes the ranked list of the trademark names/brands for the company and also includes, for example, the recent news (or links to the recent news) related to the trademark names/brands.

By providing a ranked list of trademarked names/brands (e.g., the most important names/brands) and a list of recent news associated with the trademarked names/brands, a user can derive valuable and meaningful business intelligence from a company's trademark portfolio that can help the user research companies to gain insight and identify better differentiators. As a hypothetical use case, a buy side analyst conducting research on a target company may wish to gain insights about the target company beyond the target company's financial performance. Using an example embodiment of the present disclosure, the user can view top trademarked names/brands for the target company, and then use the recent news or other data associated with the top trademarked names/brands to determine whether there have been recent reports such as sales announcements, strategic announcements, reports on quality or popularity of the trademarked names/brands, and the like. For example, if a product has been launched recently and there is news indicating that the product is not doing well in the market, the user can determine whether such news will impact the evaluation of the company.

FIG. 1A is a block diagram of an exemplary search environment 100A for enhancing query and search processing as well as supplementing or suggesting data records from disparate data sources in a networked environment in accordance with embodiments of the present disclosure. The environment 100A can include an application 108A having a user interface 110A and a query generator 130*b*, a search engine 115 including an extraction engine 120*a* and a query generator 130*a*, and data sources 140*a* and 140*b*, which can be domain-specific data sources. In exemplary embodiments, the environment 100A can provide supplemental and/or suggested data sets to users in response to a search request. The supplemental and/or suggested data sets can supplement search results returned in response to a search request for one data source (e.g., the data source 140*a*) to provide additional data to the user from at least one other disparate data source (e.g., the data source 140*b*). Subsets of the supplemental and/or suggested data sets can be paired with data elements included in or implicated by the search results.

Embodiments of the environment 100A can be distributed over a communications networks 101 and 103 between user devices (e.g., a user device 102) and servers (e.g., server(s) 104 and server(s) 106). For example, the user device 102 can include the application 108A that can be been installed thereon to facilitate interaction with the servers 104 and 106. In some embodiments, the application 108A can be an application available in an application marketplace hosted by a marketplace server with which the user device can interact to download the application 108A. While the application 108A has been illustrated as including the user interface 110A and a query generator 130*b*, the user interface 110A and/or the query generator 130*b*, or portions thereof, can be implemented by other devices, and the application 108A can include an interface for interacting with the other devices. In some embodiments, the user device 102 can be a client device configured to connect to the communications networks 101 and 103 to communicate with the servers 104 and 106, respectively. In some embodiments, the user device 102 can be a server that hosts the application 108A and that allows client devices to run the application remotely on the user device.

The server(s) 104 can include the search engine 115 and the data source 140*a*. In exemplary embodiments, the server(s) 104 can be configured to provide a parallel processing environment using one or more servers executing one or more virtual machines. The quantity of server(s) 104 being utilized and/or the quantity of virtual machine being implemented by the server can be dynamically controlled based on the resources required to perform the operations and/or functions of the search engine 115 within a specified time period (e.g., a specified number of microseconds, milliseconds, seconds, etc.). In some embodiments, an instance of the search engine 115 can be generated by the server(s) 104 for each user device that requests a search to be performed. In some embodiments, the search engine 115 can be multi-tenant search engine such that a single instance of the search engine 115 can process search requests from multiple user devices. In some embodiments, data records 142a and/or indexes 144a associated the data records 142a can be stored as distinct and separate files in the data source 140b. In some embodiments, the data records 142a and/or indexes 144a associated with the data records 142a can be stored in blocks such that a single file can store several of the data records 142a and/or indexes 144a.

The server(s) 106 can include the data source 140b and can form a separate network of server(s) than the server(s) 104. The user device 102 can interact with the server(s) 106 to retrieve data records 142b and/or links to data records 142b. While the server(s) 106 have been illustrated as forming a separate network of servers than the server(s) 104, in exemplary embodiments server(s) 104 and server(s) 106 can be part of the same network of servers.

With reference to the application 108A, the user interface 110A can include a presentation/visualization engine 112, one or more graphical user interfaces 114, a query generator 130b, and a link generator 150. The presentation engine 112 can be configured to provide an interface between one or more services and/or engines implemented in the environment 100A. For example, the presentation engine 112 can be configured to send and/or receive data from the extraction engine 120a, query generators 130a-b, the domains-specific data sources 140a-b, and/or the link generator 150. Upon receipt of data, the presentation engine 112 can be executed to generate one or more of the graphical user interfaces 114 and to render the data in the one or more graphical user interfaces 114.

The extraction engine 120a can transform or convert search terms received in a search request to one or more unique identifiers. As an example, a search request received by the extraction engine 120a can include one or more search terms (e.g., keywords or other distinguishable strings of alphanumeric characters). The extraction engine 120a can normalize the search terms to obtain standard terms that can be processed by the extraction engine 120a. The extraction engine 120a can look-up one or more unique identifiers corresponding to the normalized search terms. In exemplary embodiments, the unique identifier can be a unique string of characters and/or symbols. In some embodiments, a hierarchy of unique identifiers can exist that corresponds to a relationship between different normalized search terms recognized by the extraction engine 120a. For embodiments employing a hierarchy of unique identifiers, the extraction engine 120a perform a further look-up, using the previously identified one or more unique identifiers, to identify one or more related unique identifiers at a higher (e.g., the highest) level in the hierarchy of unique identifiers. Once the appropriate identifiers are obtained by the extraction engine 120a (e.g., the identifiers obtained based on the normalized search terms or the higher level identifiers in a hierarchy), the extraction engine 120a can provide the appropriate identifiers to the query generator 130a.

The query generator 130a can generate or build one or more queries (e.g., database or web-based queries) associated with the data source 140a based on the one or more unique identifiers provided by the extraction engine 120a. The queries can be generated or built using one or more query languages, such as Structured Query Language (SQL), Contextual Query Language (CQL), proprietary query languages, domain specific query languages and/or any other suitable query languages. In some embodiments, the query generator 130a can generate or build one or more queries using one or more programming languages or scripts, such as Java, C, C++, Perl, Ruby, and the like. For example, the query generator 130a can be a code generator that processes the unique identifier(s) provided by the extraction engine 120a and generates code based on the identifiers.

The data source 140a can include one or more data records 142a arranged according to an index 144a. In some embodiments, the data source 140a can be a domain-specific data source such that one or more data records 142a can include similar types or forms of content, which can define the domain of the data. For example, the content of the one or more data sets can be related to domains, such as registered trademarks, legal decisions, scientific articles, news articles (including test, videos, and/or audio), financial reports, fictional literature, non-fictional literature, videos associated with a specific topic, audio files associated with a specific topic, and/or any other suitable domains. In some embodiments, each data record can be formatted using data fields or tags where portions of the data record (e.g., data elements) are associated with specific data fields or tags in the data record.

The data source 140a (or a different data source) can include analytical/statistical data associated with the data records 142a maintained by the data source 140a and/or associated with data derived from or obtained based on the data records 142a. For example, subsets of the data records 142a can include identical data elements for one or more data fields or tags. That is, the subsets of the data records 142a can be defined based on whether they have identical or similar data elements for a given data field or tag. The identical or similar data elements for the given data field or tag can be analyzed to provide analytical/statistical data that are associated with the individual data records 142a that form the subset(s), are associated with the subset(s) of data records, and/or are associated with the subset(s) relative to other subsets and/or relative to all of the data records 142a stored in the data source 140a. As one example, the analytical/statistical data can impart a ranking to the data records 142a within a given subset of the data records. As another example, data elements included in the subset(s) for a given field or tag can form a subsequent queries of other data sources to obtain information associated with or pertaining to the data elements, and a ranking can be based on analytical/statistical data associated with the information obtained from the other sources or can be based on analytical/statistical data associated with the data elements or data records 142a and the information obtained from the other sources.

The data records 142a stored in the data source 140a can be searched in response to one or more queries created by the query generator 130a. As one example, the data source 140a can return a first set of data records having the identifiers included in the one or more queries generated by the query generator 130a. The first set of data records can correspond a subset of the data records for which analytical and/or statistic data exists. In addition to returning the first set of data records, or in the alternative, the data source 140a can return the analytical/statistical data associated with the first set of data records implicated by the unique identifier. The analytical/statistical data can impart relationships between the data elements included in the data records of the first set, such as an ordered ranking based on the data elements based on, for example, a frequency with which instances of the data elements are found in a specified tag or data field of the data records (e.g., a number of times the same data element is found in a particular tag or data field in the data records).

Once the first set of data records 142a and/or the analytical/statistical data have been received by the user interface, the presentation engine 112 can display the analytical/statistical data associated with the first set of data records via one or more of the graphical user interfaces 114, the link generator 150 can generate one or more links associated with specified data elements from the data records of the first set based on the analytical/statistical data, as described herein, and the query generator 130b can generate a query incorporating at least one of the data elements and submit the query to the second data source 140b, as described herein.

The query generator 130b can generate or build one or more queries (e.g., database or web-based queries) associated with the data source 140b based on one or more data elements from the first set of data records and/or included in the analytical/statistical data associated with the first set of data records. The queries can be generated or built using one or more query languages, such as Structured Query Language (SQL), Contextual Query Language (CQL), proprietary query languages, domain specific query languages and/or any other suitable query languages. In some embodiments, the query generator 130b can generate or build one or more queries using one or more programming languages or scripts, such as Java, C, C++, Perl, Ruby, and the like. For example, the query generator 130b can be a code generator that processes the set of data elements provided by the extraction engine 120b and generates code based on the data elements.

The data source 140b can include one or more data records 142b. The one or more data records 142b can arranged according to an index 144B. In some embodiments, the data source 140b can be a domain-specific data source such that the data records 142b include can include similar types or forms of content, which can define the domain of the data. For example, the content of the one or more data sets can be related to domains, such as registered trademarks, legal decisions, scientific articles, news articles (including text, videos, and/or audio), financial reports, fictional literature, non-fictional literature, videos associated with a specific topic, audio files associated with a specific topic, and/or any other suitable domains. In exemplary embodiments, the data sources 140a and 140b are disparate data sources such that the data source 140b includes data records from a domain that is different from the domain of the data records of the data source 140a; the data records of the data source 140b have a different data format then the data format of the data records of the data source 140a; the data source 140b has a different query structure and/or format then the query structure and/or format associated with the data source 140a.

The data records 142b stored in the data source 140b can be searched in response to one or more queries created by the query generator 130b. As one example, the data source 140b can return a second set of data records corresponding to at least one of the data elements included in the one or more queries generated by the query generator 130b and/or can return links to data records in the second set of data records.

The link generator 150 can generate one or more links for the data elements identified in the analytical/statistical data for the first set of data source 140a, which when selected by a user, can cause the user interface to call the query generator 130b to generate a query including the data element associated with the selected link and submit the query to the second data source 140b to retrieve a second set of data records and/or links to the second set of data records. In exemplary embodiments, the user interface 110A can have a default operation when the data elements from first set of data records and/or the analytical/statistical data associated with the data elements is received, in which the user interface automatically activates a link associated with one of the data elements to retrieve data records from the second data source 140b corresponding to the data element from the first set and/or to retrieve links to the data records of the second set.

Figure 2A:
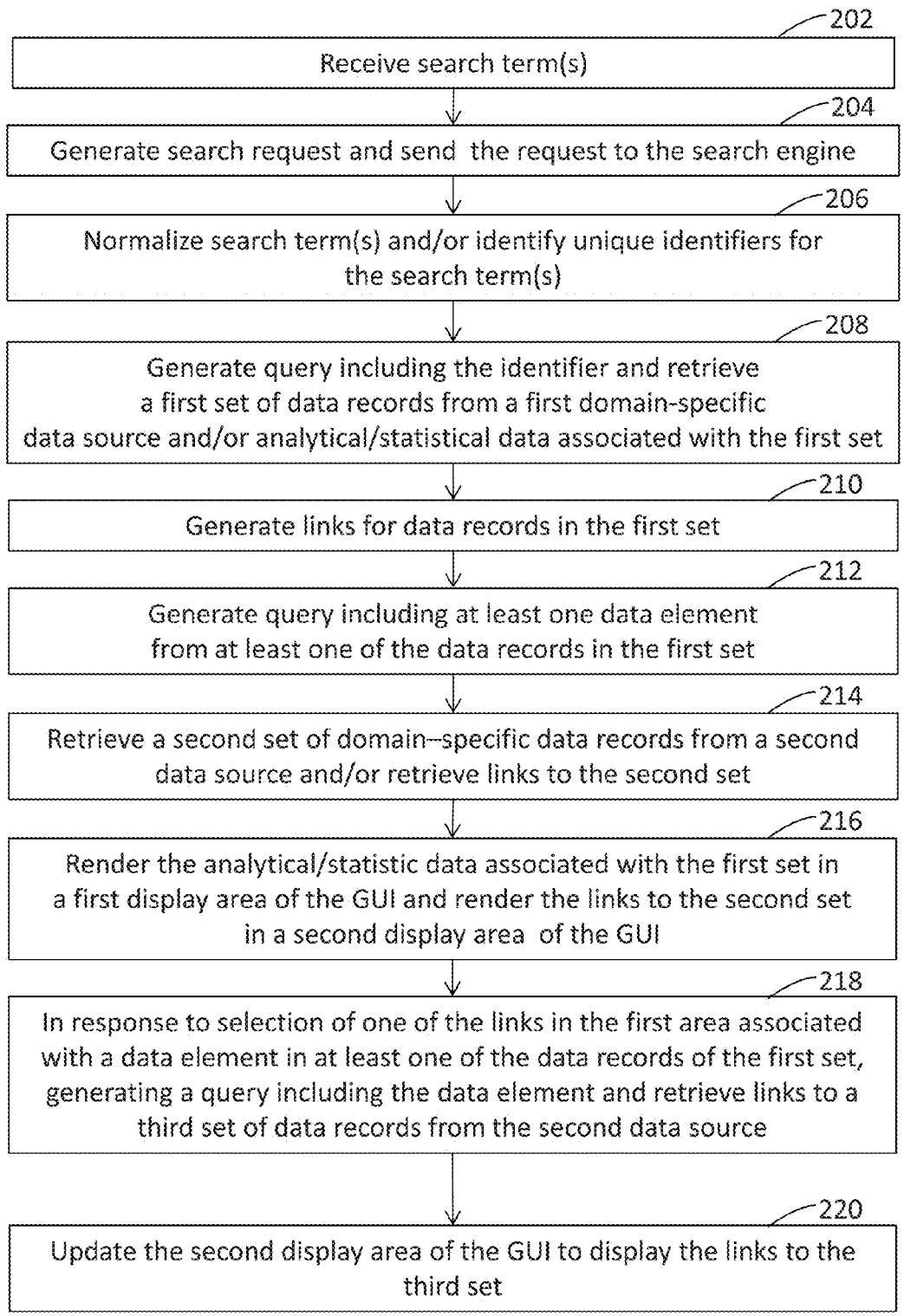
FIGS. 2A-B are flowcharts illustrating exemplary processes for enhancing query and search processing in accordance with embodiments of the present disclosure.

In an exemplary operation of embodiments of the environment 100A, with reference to FIGS. 1A and 2A, at step 202, one of the graphical user interfaces 112 generated by the presentation engine 112 can receive, as an input from a user, one or more search terms. At step 204, the presentation engine 112 can generate a search request including the search term(s) received from the user and can send the search request to the search engine 115. At step 206, the extraction engine 120a can be executed to normalize the search term(s), if necessary, and to identify one or more unique identifiers corresponding the (normalized) search term(s). At step 208, the unique identifier(s) can be provided to the query generator 130a, which can generate one or more queries incorporating the unique identifier(s) and can submit the queries to the data source 140a to retrieve the first set of data records 142a and/or analytical/statistic data associated with or derived based on the first set of data records 142a (e.g., an order ranking based on a frequency with which a data element is found in the first set of data records 142a for a given tag or data field).

Upon receipt of the first set of data records and/or the analytical/statistical data associated with the first set of data records, the link generator 150 can generate links associated with the data elements utilized to generate the analytical/statistical data at step 210, and can generate a query including at least one of the data elements at step 212. The query can be submitted to the second data source 140b to retrieve a second set of data records and/or links to the second set of data records at step 214. At step 216, the presentation engine 112 can render the analytical/statistical data (e.g., as a ranked list of data elements from the data records of the first set) in a first display area the graphical user interface and can render the links to the second-set of data records in a second display area to supplement the analytical/statistical data displayed in the first display area and/or to suggest data to the user. The links to the second set of data records can be selected to retrieve the data records in the second set from the second data source and to render the data records on a display and/or save the data records to a storage device.

At step 218, in response to selection of a link in the first display area that is associated with one of the data elements, the query generator 130b can generate a query including the data element associated with the link and can submit the query to the second data source 140b to retrieve a third set of data records and/or links to a third set of data records from the second data source 140b. At step 220, the presentation engine 112 can update the second display area to replace the links to the second set of data records with the links to the third set of data records to supplement the analytical/statistical data displayed in the first display area and/or to suggest data to the user.

Figure 1B:
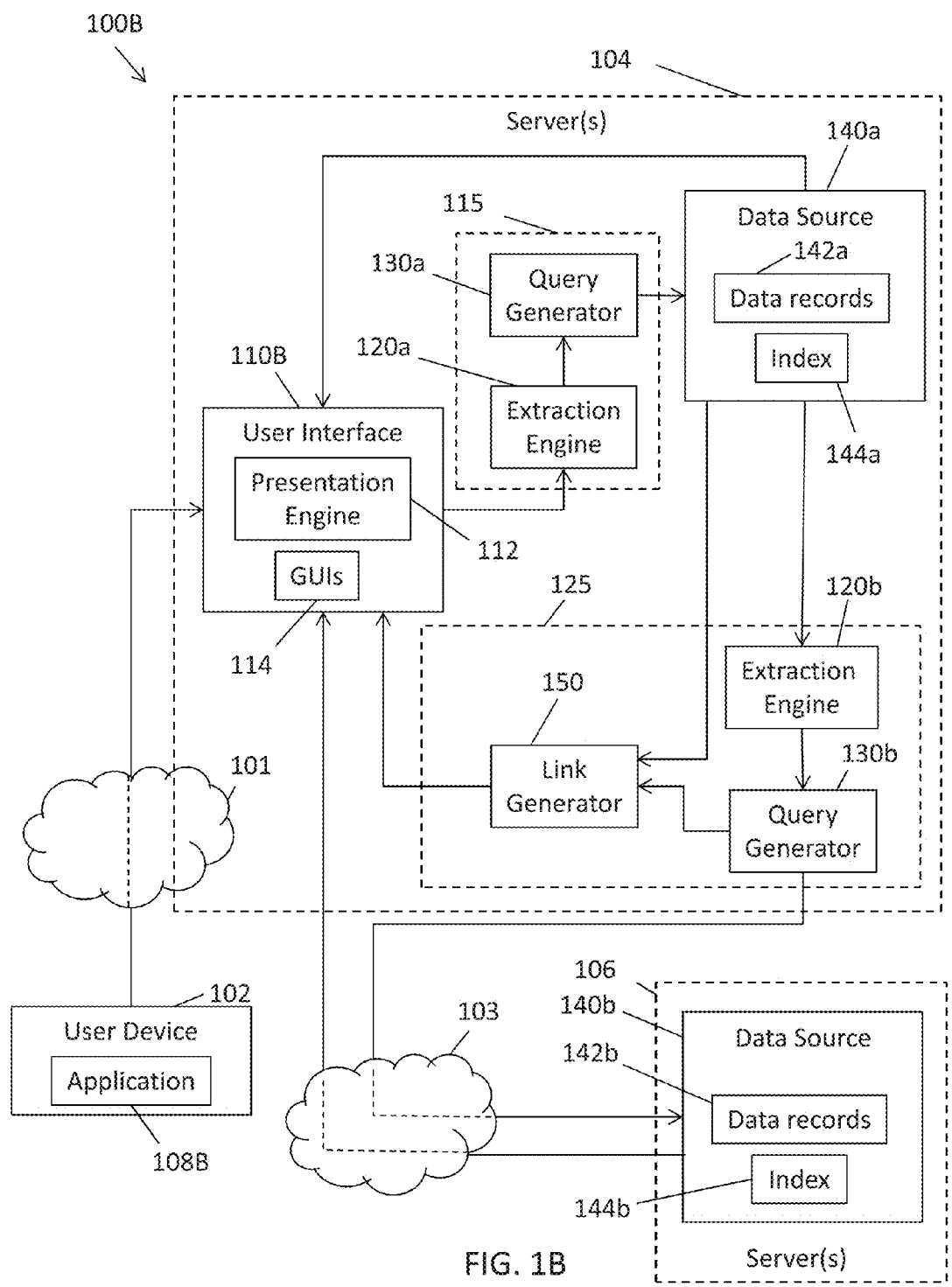

FIG. 1B is a block diagram of an exemplary search environment 100B for enhancing query and search processing as well as providing suggest data records from disparate data sources in accordance with embodiments of the present disclosure. The environment 100B can include a user interface 110B, an extraction engines 120a-b, query generators 130a and 130b, data sources 140a and 140b, and a link generator 150. The extraction engine 120a and query generator 130a can form a search engine 115. The extraction engine 120b, query generator 130b, and link generator 150 can form a search engine 125. In exemplary embodiments, the environment 100B can provide supplemental and/or suggested data sets to users in response to a search request. The supplemental and/or suggested data sets can supplement search results returned in response to a search request for one data source (e.g., the data source 140a) to provide additional data to the user from at least one other disparate data source (e.g., the data source 140b). Subsets of the supplemental and/or suggested data sets can be paired with data elements included in or implicated by the search results.

Embodiments of the environment 100B can be distributed over a communications networks 101 and 103 between user devices (e.g., the user device 102) and the servers (e.g., server(s) 104 and server(s) 106). For example, the user device 102 can include the application 108B that can be been installed thereon to facilitate interaction with the server(s) 104. In some embodiments, the application 108B can be client-side application that facilitate interaction with the servers. For example, in some embodiments, the application 108B can be a web browser or a proprietary application that is programmed to interact with the server(s) 104.

The server(s) 104 can include the search engine 115, the search engine 125, and the data source 140b. In exemplary embodiments, the server(s) 104 can be configured to provide a parallel processing environment using one or more servers executing one or more virtual machines. The quantity of server(s) 104 being utilized and/or the quantity of virtual machine being implemented by the server can be dynamically controlled based on the resources required to perform the operations and/or functions of the search engines 115 and 125 within a specified time period (e.g., a specified number of seconds). In some embodiments, an instance of the search engine 115 and/or search engine 125 can be generated for each user device that requests a search to be performed. In some embodiments, the search engine 115 and/or search engine 125 can be multi-tenant search engines such that a single instance of the search engine 115 and/or the search engine 125 can process search requests from multiple user devices. In some embodiments, data records 142a can be stored as distinct and separate files in the data source 140a. In some embodiments, the data records 142a and/or indexes 144a associated the data records 142a can be stored in blocks of files such that a single file can store several of the data records 142a and/or indexes 144a.

The server(s) 106 can include the data source 140b and can form a separate network of server(s) than the server(s) 104. The server(s) 104 can interact with the server(s) 106 via communications network 103 to retrieve data records 142b and/or links to data records. While the server(s) 106 have been illustrated as forming a separate network of servers than the server(s) 104, in exemplary embodiments server(s) 104 and server(s) 106 can be part of the same network of server.

The user interface 110B can include a presentation/visualization engine 112 and one or more graphical user interfaces 114. The presentation engine 112 can be configured to provide an interface between one or more services and/or engines implemented in the environment 100B and to communicate with the application 108B via the communication network 101. For example, the presentation engine 112 can be configured to send data to and/or receive data from the application 108B, the extraction engines 120a-b, query generators 130a-b, the domains-specific data sources 140a-b, and/or the link generator 150. Upon receipt of data, the presentation engine 112 can be executed to generate one or more of the graphical user interfaces 114 and to render the data in the one or more graphical user interfaces 114.

The extraction engine 120a can transform search terms received in a search request to one or more unique identifiers, as described herein, and the query generator 130a can generate or build one or more queries (e.g., database or web-based queries) associated with the data source 140a based on the one or more unique identifiers provided by the extraction engine 120a, as described herein.

Once the first set of data records 142a and/or the analytical/statistical data for the first set have been retrieved, the extraction engine 120b can extract data elements from the data records. For example, in some embodiments, the extraction engine 120b can extract a data element associated with a specific data field or tag from each of the data records 142a forming the first set of data records to form a set of data elements. Repetitive data elements can be excluded from the set of data elements such that the set of data elements are unique to other data elements in the set. The extraction engine 120b can provide the set of data elements to the query generator 130b and the link generator 150, and can provide the set of data elements and the associated analytical/statistical data to the user interface 110B.

The query generator 130b can generate or build one or more queries (e.g., database or web-based queries) associated with the data source 140b based on the one or more data elements form the set of data elements extracted from the first set of data records by the extraction engine 120b. The queries can be generated or built using one or more query languages, such as Structured Query Language (SQL), Contextual Query Language (CQL), proprietary query languages, domain specific query languages and/or any other suitable query languages. In some embodiments, the query generator 130b can generate or build one or more queries using one or more programming languages or scripts, such as Java, C, C++, Pert, Ruby, and the like. For example, the query generator 130b can be a code generator that processes the set of data elements provided by the extraction engine 120b and generates code based on the data elements.

Once the second set of data records 142b have been retrieved, the second set of data records 142b can provided to the link generator 150 and the user interface 110B. The link generator 150 can generate one or more links between each of the data elements identified by the extraction engine 120b with a corresponding subset of the second set of data records to create an explicit relationship between the data elements of the data records of the second set of data records. Alternatively, or in addition, the link generator can generate a link associated with the data elements of the second set of data records such that activation of the link calls a function or services that identifies and navigates to a subset of the second set of data records corresponding to data element associated with the link.

Figure 2B:
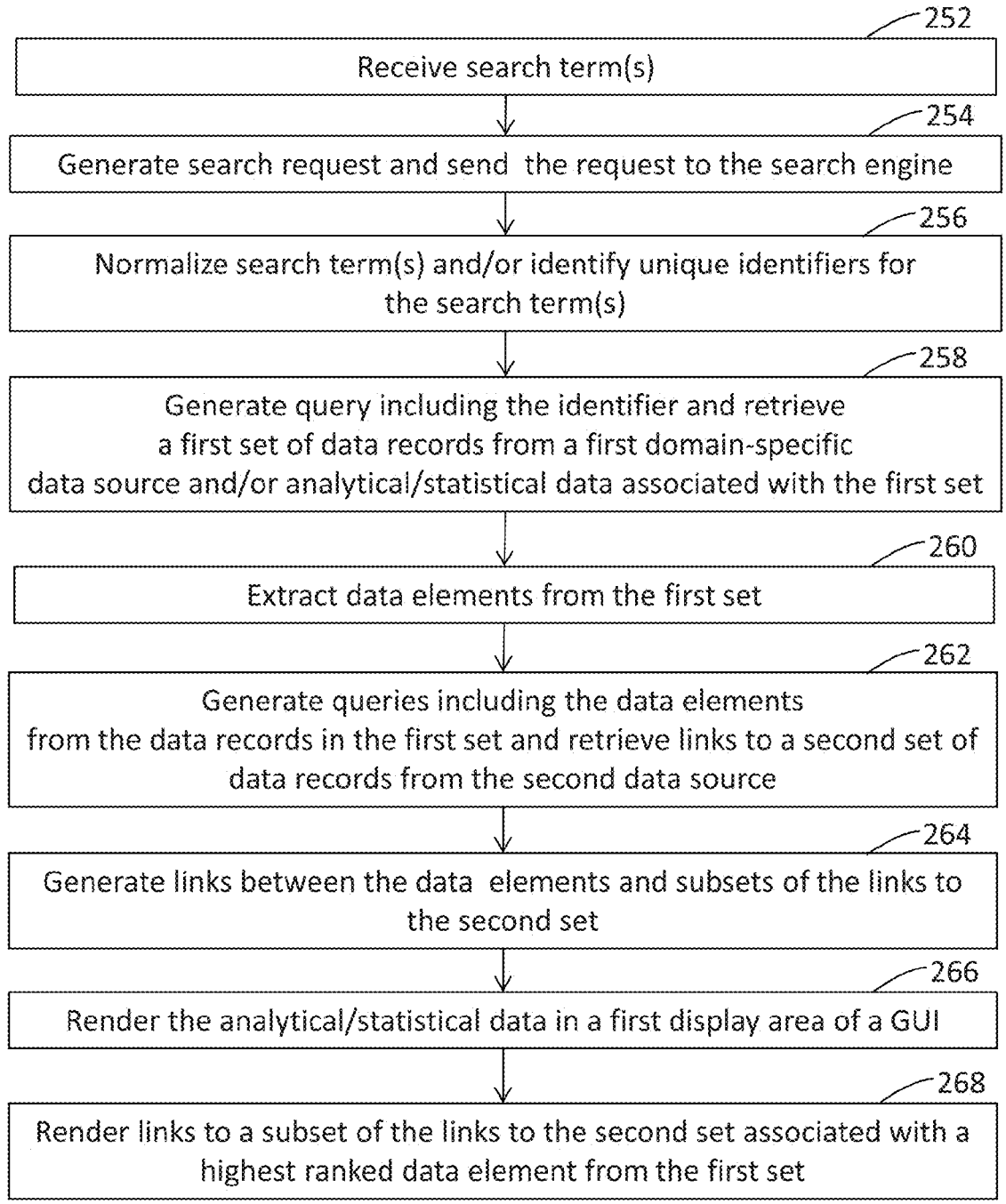

In an exemplary operation of embodiments of the environment 100B, with reference to FIGS. 1B and 2B, at step 252, one of the graphical user interfaces 112 generated by the presentation engine 112 can receive, as an input from a user, one or more search terms. At step 254, the presentation engine 112 can generate a search request including the search term(s) received from the user and can send the search request to the search engine 115. At step 256, the extraction engine 120a can be executed to normalize the search term(s), if necessary, and to identifier one or more unique identifiers corresponding the (normalized) search term(s). At step 258, the unique identifier(s) can be provided to the query generator 130a, which can generate one or more queries incorporating the unique identifier(s) and can submit the queries to the data source 140*a* to retrieve the first set of data records 142*a* and/or analytical/statistic data associated with the first set of data records 142*a*.

At step 260, the extraction engine 120*b* can be executed to extract data elements from the first set of data records 142*a* (e.g., based on specific data fields or tags in the data records) and can send the data elements to the query generator 130*b*. At step 262, the query generator 130*b* can be executed to generate one or more queries including the data elements identified by the extraction engine 120*b* to retrieve the second set of domain specific data records 142*b* from the data source 140*b* corresponding to the data elements.

At step 264, the link generator 150 can generate one or more links between the data elements and the data records included in the second set of data records 142*b*. The presentation engine 220 can receive the first and second domain specific data sets, the analytical/statistical data associated with the first set of data records, and the links generated by the link generator 150. At step 266, the presentation engine 112 can generate one of the graphical user interfaces 114 and can render analytical/statistical data associated with the data elements identified by the extraction engine 120*b* from the first set of data. For example, the presentation engine 112 can render a ranked list of the data elements based on the analytical/statistical data.

At step 268, within the same graphical user interface, the presentation engine can render links to at least a subset of the second data records. For example, the presentation engine 112 can be programmed to render links associated with a subset of the second set of data records corresponding to the data element associated with the highest ranking. The links to the data records of the second set of data records can be updated in response to a selection of a link associated with another one of the data elements in the ordered list. For example, the user can select a link associated with a lower ranking data element and the presentation engine 112 can update the graphical user interface to render links associated with another subset of the second set of data records associate with the lower ranking data element. In some instance, the subsets of data records can be mutually exclusive, and in some instances, the subsets can have overlapping data records.

While embodiments of the environment have been illustrated in FIGS. 1A-B as including distinct and separate components (e.g., applications, engines, interfaces, and generators), exemplary can include more or fewer components and/or one or more of the components can be integrated with one or more of the other components. As one example, the extraction engine 120*a* and the query generator 130*a* can be integrated to form an integrated component that is configured and/or programmed to perform the operations and/or functions of the extraction engine 120*a* and the query generator 130*a*. As another example, the extraction engine 120*b* and the query generator 130*b* can be integrated to form an integrated component that is configured and/or programmed to perform the operations and/or functions of the extraction engine 120*b* and the query generator 130*b*.

Additionally, while embodiments of the environment have been illustrated in FIGS. 1A and 1B as including two disparate data sources 140*a* and 140*b*, exemplary embodiments of the environment can utilize more than two data sources. For example, in some embodiments, the query engine 130*a* can be configured and/or programmed to query two or more data sources based on one or more unique identifiers identified by the extraction engine 120*a*, and the query engine 130*b* can be configured and/or programmed to query two or more different data sources based on the data elements identified by the extraction engine 120*b*.

FIGS. 3-8 provide non-limiting examples of embodiments of the search environment described herein in relation to a specific application of embodiments of the search environment. While FIGS. 3-8 illustrate an exemplary application of embodiments of the environment, those skilled in the art will recognize that embodiments of the environment can be implemented to enhance search for and discovery of data in a wide range of applications and fields.

In exemplary embodiments described in relation to FIGS. 3-8, systems and processes performed the system to conduct enhanced data searching of disparate data sources and providing supplemental or suggested data sets. As an example, the system and processes described herein can be used to provide combinatorial business intelligence that allows users to discovery information about, for example, the sector and geographic focus of a company and/or to discover top products/brands of a company based, at least partially, on registered trademark records stored in one or more disparate databases (e.g., a database of trademark data corresponding to trademarks registered in the United States, a database of trademark data corresponding to trademarks registered in Switzerland, etc.). Trademark records in the databases can contain information, such as a sector classification, filing country, history, status, owner affiliates, assignment information, goods/services associated with the trademarks, as well as other information that can be used by embodiments of the present disclosure. Exemplary embodiments of the present disclosure can utilize the information stored in the databases for the trademark records to identify and suggest data records from other data sources, such as databases or repositories storing news articles (or links thereto), web pages (or links thereto), and/or any other suitable data records.

In a non-limiting example embodiment, a downloadable application can be provided through an application marketplace, such as an EIKON application marketplace from Thomson Reuters or any other suitable application marketplace. The application allows users to conduct research on companies based on information in trademark content. In some embodiments, Elastic search can be used to make trademark records data searchable and accessible. Trademark owner information in the trademark records can be mapped to and/or matched against one or more a hierarchical organization data structures to identify and/or obtain an ultimate parent organization for the trademark owner. In some embodiments, owners of trademarks can be mapped to organizational authority (OA) Permanent Identifiers (PermIDs) using Search Engine Framework (SEF) and Concord. The PermIDs can be sent to EAN to obtain the ultimate parent organization.

Trademark records in a trademark database can include a rich set of data that can provide information about a company and/or its trademarked names/brands that can be leveraged and combined with other sources of data (e.g., a database storing news), which can be presented to a user in an integrated graphical user interface, to facilitate combinatorial business intelligence for one or more company. For example, a user can submit a search request through the application downloaded from the EIKON marketplace that identifies a company of interest, and one or more servers can process the request to obtain an identifier associated with the name of the company included in the search. Using this identifier, the one or more servers can retrieve analytical data associated with or derived based on trademark records corresponding to the company included in the search. The analytical data can include, for example, a ranked list of trademarked names/brands for the company, which can be returned to the user's device and which can be used to retrieve new associated with the trademarked names/brands in the ranked list.

In some embodiments, the ranked list can be based on data obtained based on the trademark names/brands. For example, the trademark names/brands can be used to search corporate data, financial data, news, webpages, and the like, and the ranked list can be based on the corporate data, financial data, news, webpages, and the like, returned for the given trademark names/brands. As one example, the ranked list can be based on a number of times an instance of the trademark names/brands are included or mentioned in corporate data, financial data, news, webpages, and the like. As another example, the number of times a trademark name/brand has been registered can be normalized by the number of employees the trademark owner has, the revenue of the trademark owner, the valuation of the trademark owner, and the like, and the ranked list can be derived based on this normalization. In some embodiments, the number of times a trademark name/brand is mentioned in corporate data, financial data, news, webpages, and the like, can be combined with the number of times a trademark name/brand has been registered to form the analytical/statistical data. In some embodiments, a sentiment associated with, or context in which, the trademark name/brand is mentioned can be used to provide a weighting to the ranking (e.g., a positive context/sentiment, such as a news report that sales are improving, can have a greater weighting then a negative context/sentiment, such as a news report that sales are disappointing).

A combined or integrated view can be generated in a graphical user interface that includes the ranked list of the trademark names/brands for the company and also includes the recent news (or links to the recent news) related to the trademark names/brands. The combined or integrate view of the ranked list of trademarked names/brands (e.g., the most important names/brands) and the list of recent news associated with the trademarked names/brands can be used by a user to derive valuable and meaningful business intelligence from a company's trademark portfolio that can help the user research companies to gain insight and identify better differentiators. Using an example embodiment of the application, the user can view top trademarked names/brands for the target company and then use the recent news associated with the top trademarked names/brands to determine whether there have been recent reports such as sales announcements, strategic announcements, reports on quality or popularity of the trademarked names/brands, and the like.

In some embodiments, the trademarked names/brands can correspond to the string of characters in a data field corresponding to the trademark name in the trademark database. In some embodiments, the trademarked names/brands can be identified as corresponding to anyone of a company name, slogans, product names, and the like, and the analytical data generated be include analytical data (e.g. rankings) specific to what the trade mark represents (e.g., top companies, top slogans, top products). This can provide further granularity to allow user to specify or limit their search to a subset of trademarks based on what those trademarks represent, and likewise to limit the new returned to news specific to the trademark names/brands included in the identified subset of trademarks.

Figure 3:
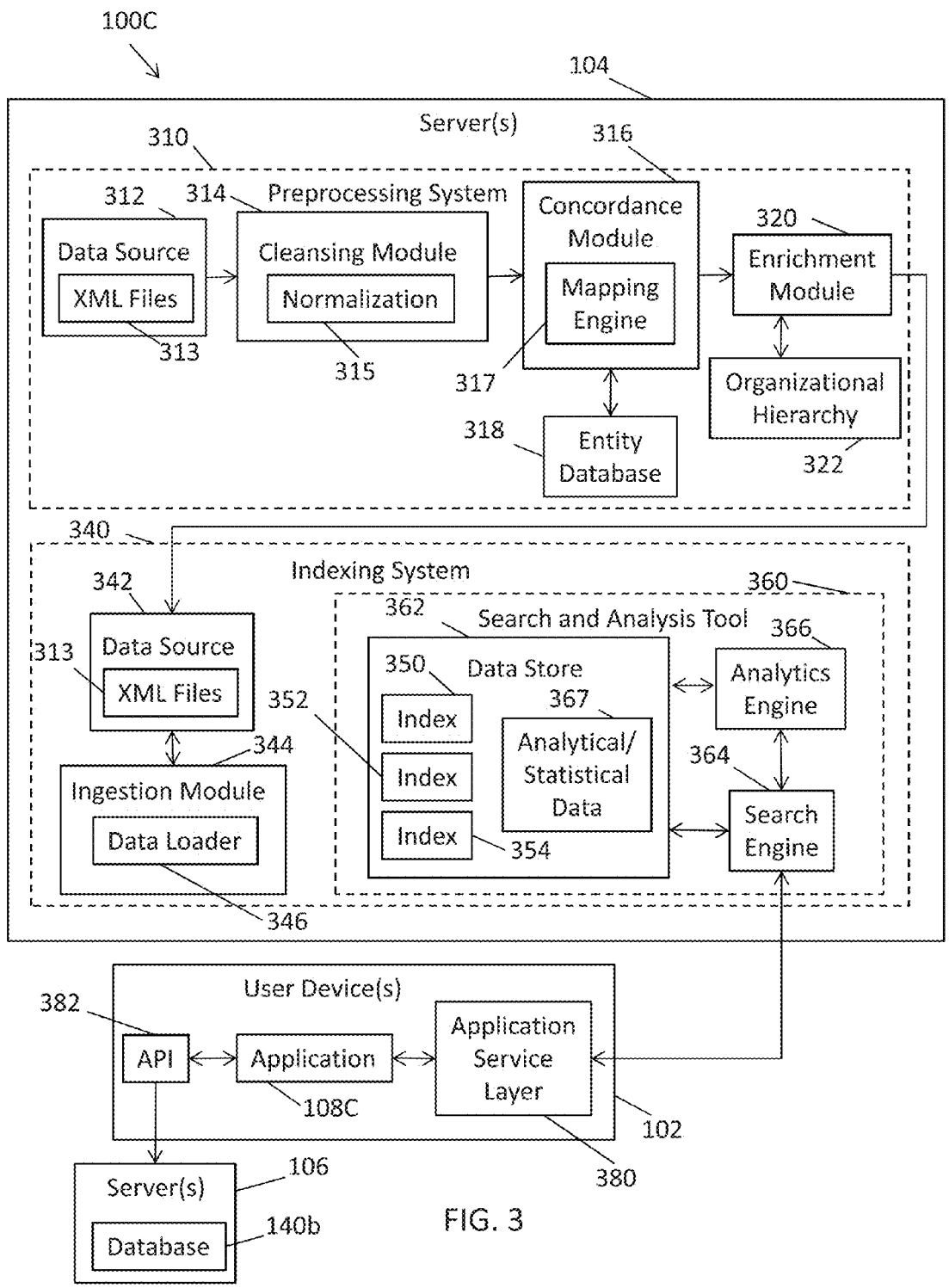
FIG. 3 is a block diagram of an example application utilizing enhanced query and search processing in accordance with embodiments of the present disclosure.

FIG. 3 shows a block diagram of an exemplary search environment 100C that utilizes information in trademark records to facilitate suggesting news articles to a user. The environment 100C can include a preprocessing system 310, an indexing system 340, an application 108C, an application service layer 380, and a visualization system 390. Embodiments of the environment 100C can be distributed over a communications network between user devices (e.g., a user device 102) and servers (e.g., server(s) 104 and server(s) 106).

The server(s) 104 can include the preprocessing system 310 and the indexing system 340. In exemplary embodiments, the server(s) 104 can be configured to provide a parallel processing environment using one or more servers executing one or more virtual machines. The quantity of server(s) 104 being utilized and/or the quantity of virtual machine being implemented by the server can be dynamically controlled based on the resources required to perform the operations and/or functions of the preprocessing system 310 and/or indexing system 3440 within a specified time period (e.g., a specified number of seconds).

The server(s) 106 can include the data source 140b in the form of a news database server. The user device 102 can interact with the server(s) 106 to retrieve data records and/or links to data records related to the news articles. While the server(s) 106 have been illustrated as forming a separate network of servers than the server(s) 104, in exemplary embodiments server(s) 104 and server(s) 106 can be part of the same network of server.

Figure 4:
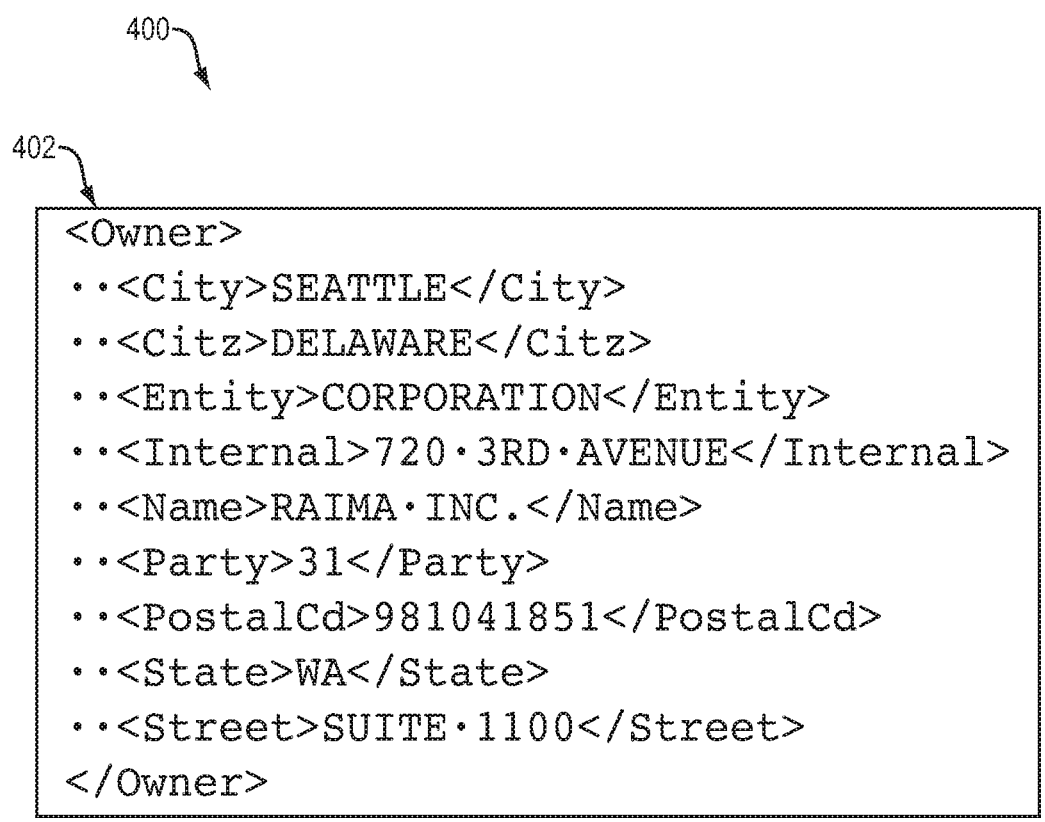
FIG. 4 is an excerpt of an example data record in accordance with embodiments of the present disclosure.

The preprocessing system can process trademark records retrieved from a data source storing trademarks (e.g., a trademark database server 312) to enhance the trademark records. In exemplary embodiments, each trademark record in the trademark database can be stored using an identical format. For example, each trademark record can be stored in an extensible mark-up (XML) language file 313 including data elements and tags associated with the data elements. The tags can relate to the identity of the owner of the trademark, an address of the owner, the trademark, the goods/services associated with the trademark, a classification associated with the goods/service, and the like. FIG. 4 shows an excerpt of an example XML file 400 for a trademark record identifying an owner for the trademark corresponding to the trademark record. As shown in FIG. 4, the XML file can include an owner tag 402 including several other tags and data elements associated with the respective tags that provides information about the owner of the trademark (e.g., type of entity, company name, company address, etc.).

Referring again to FIG. 3, a copy of each trademark record (e.g., as defined by an XML file) in the trademark database is generated (e.g., another instance of the XML file is generated) and processed by a cleansing module 314. The cleansing module can normalize data elements stored in the copied trademark record based on a normalization schema 315. For example, company names and address information can be normalized so that the data elements in the copied trademark records are formatted to be uniform. A concordance module 316 implements a mapping engine 317 that maps the tags in the copied and normalized XML file to data fields in an entity database server 318 to facilitate alignment of data elements corresponding to the tags to data elements corresponding to data fields in the entity database. That is, the concordance 316 determines which tags and data fields represent the same data. In exemplary embodiments, the entity database can be an organizational authority that includes entity records for known legal entities. Each entity record can include a legal name of a company, an address of a company, and/or any other suitable information that can be used to identify a company. In addition, each entity record can include a unique identifier corresponding to the company associated with the entity record.

For each copied and normalized trademark record (e.g., as defined by an XML file), the data elements associated with the owner tag are queried against the entity records by the concordance module 316, and the entity database returns a list of matches having similarity scores quantifying similarities between the data elements in the owner tag of a given trademark record and the data elements in an entity records. In some embodiments, similarity scores can be determined based on string similarities between the owner data in the trademark record and entity data in the entity database. In exemplary embodiments, the entity record having the greatest similarity score is determined to be the closest match to the owner of the trademark associated with the trademark record. In response to identifying the closest entity record matching the owner of the trademark, the concordance module 316 can add the unique identifier associated with the entity record to the trademark record (e.g., can generate an identifier tag and include the unique identifier as a data element of the tag).

Subsequently, each copied trademark record is processed by an enrichment module 318 to determine whether the company identified as the owner of the trademark record is a subsidiary of a parent company. In exemplary embodiments, the enrichment module 318 can map the unique identifier added to each copied trademark record to another unique identifier associated with a parent company—if applicable. For example, a unique identifier can belong to an organizational hierarchy in an organizational hierarchy database 322 of unique identifiers, and the unique identifier at the highest level of the hierarchy (e.g., an entity top level organizational identifier or a parent identifier) can represent a parent company. In response to identifying a parent company exists, the unique identifier of the parent company can replace the unique identifier previously added to the copied trademark record (e.g., can overwrite the data element associated with a identifier tag with the parent identifier). Once a parent identifier has been identified, subsidiaries of the parent company can be identified using the parent identifier.

The preprocessing system 310 can perform the above-described process for each trademark stored in each trademark database utilized by embodiments of the present disclosure (e.g., a database of trademarks registered in the United States, a database of trademarks registered in Switzerland, etc.). After the copied trademark records are preprocessed to normalize at least some of the data elements in the copied trademark records, and to tag the copied trademark records with one or more unique identifiers, the copied trademark records are provided to the indexing system 340.

The copied, normalized, and tagged trademark records (e.g., XML files 313') provided to the indexing system 340 are stored in a data source 342 (e.g., an intermediate database). An ingestion module 344 continuously or periodically queries the data source 342 for trademark records added by the preprocessing system 310. In response to determining that trademark records are stored in the data source 342, the ingestion system executes a data loader 346 that inserts the trademark records into an index (e.g., an index 350 corresponding to trademarks registered in the United States, an index 352 corresponding to trademarks registered in Switzerland, an index 354 corresponding to trademarks registered globally) maintained by a data store 362 upon which search and analytics engines 364 and 366 of a search and analysis tool 360 operate. The indexes stored by the data store 362 can be data sources, where the domain can be trademarks by country/region.

The search engine 364 facilitates searching the contents of the indexes in the date store in response to search requests to identify identifiers associated with search terms received in a search request and to facilitate analytical and statistical processing via the analytics engine 366. The search engine 364 can facilitate full text searching and/or natural language searching. In some embodiments, an instance of the search engine 364 can be generated for each user device that requests a search to be performed. In some embodiments, the search engine 364 can be a multi-tenant search engine such that a single instance of the search engine 364 can process search requests from multiple user devices.

The analytics engine 366 can operate to generate and store analytical/statistical data 367 for the trademark records stored in the indexes and/or based on additional information obtained from other data sources including from corporate data, financial data, news, webpages, and the like. As one example, subsets of the trademark references can be identified based on one or more data elements included in the indexed trademark records and analytical and/or statistic data can be generated for the subsets. As another example, trademark names/brands in the trademark records can be used to search one or more other data sources to identify information, such as corporate data, financial data, news, webpages, and the like, based on the trademark names/brands, and the information can be used to generate the analytical/statistical data 367. In some embodiments, the information obtained from the other data sources can be combined with data from trademark records to form the analytical/statistical data 367. For example, the number of times trademark name/brand has been registered and the number of mentions of the trademark name/brand in corporate data, financial data, news, webpages, and the like can be combined to form a ranked list of trademarks (e.g., where the more times a trademark name/brand is registered and the more times the trademark name/brand are mention the greater the rank of the trademark name/brand). As another example, the number of times a trademark name/brand has been registered by the trademark owner can be normalized by the number of employees the trademark owner has, the revenue of the trademark owner, the valuation of the trademark owner, and the like, and the ranked list can be derived based on this normalization.

In exemplary embodiments, subsets of the trademark records across the indexes of the data store 362 can be identified based on a search for the unique identifiers that were added to the trademark records. For each subset of trademark records identified based on a given unique identifier, the analytics engine 366 can identifier the registered trademark associated with each of the trademark records in the subset and can rank the registered trademarks relative to other registered trademarks within a given subset (e.g., the set of trademarks owned by a given entity) based on one or more ranking algorithms, such as one or more ranking algorithms described herein. The ranking can be stored in the data store 362. As more trademark records are added to the indexes, the analytics engine 366 can recalculate the rankings. The rankings maintained by the analytics engine 366 can impart explicit relationships between the trademark records with a subset of trademark records.

In exemplary embodiments, an importance of brands are can be determined, for example, based on a total number of trademarks that are filed or registered for each brand name owned by a given entity. As a non-limiting example, the rank of a given brand relative to other brands owned by an entity can be determined as the sum of trademarks for a brand across a given set of trademark databases. For example, assuming that the United States Federal register and the Swiss register as well as X additional registers, the rank value $R_v$, of a given brand can be expressed mathematically as follows:

$$R_v = N_{BRAND,US} + N_{BRAND,CH} + \ldots + N_{BRAND,n}$$

where "$N_{BRAND,US}$" denotes the number of active trademarks for the BRAND in the US Federal register, "$N_{BRAND,CH}$" denotes the number of active trademarks for the BRAND in the Swiss register, and "$N_{BRAND,X}$" denotes the number of active trademarks for the BRAND in an $n^{th}$ register. Every trademark database register included in the environment can add to the rank value measure. The rank values of the brands owned by an entity can be compared relative to each other where the higher the rank value is for a given brand, the higher the rank is for the brand.

In some embodiments, weight coefficients can be utilized to provide more value to certain registers or brands. For example, because the United States Federal register serves a larger market than the Swiss register, more weight can be given to trademarks registered in the United States.

$$R_v = a \times Ind = w_{US} \times N_{IPHONE,US} + w_{CH} \times N_{IPHONE,CH}$$

where "$w_{US}$" denotes a weighting coefficient for trademarks in the United States Federal register, "$w_{CH}$" denote a weighting coefficient for trademarks in the Swiss register, "a" denotes a normalization coefficient, and "Ind" denotes an importance index.

In some embodiments, other sources can be used in addition to, or instead of, the number of registered trademarks for a brand. As one example, the rank can be determined based a quantity of times a trademark name/brand is mentioned in news articles over a specified time period (with decreasing weight being given the older news articles). In some embodiments, the context within which the brand is mentioned in the news articles can be a factor in ranking brands (e.g., positive mentions can have more weight than negative and neutral mentions, and negative mentions can have more weight than neutral mentions). As another example, as described herein, the number of times a trademark name/brand has been registered can be normalized by the number of employees the trademark owner has, the revenue of the trademark owner, the valuation of the trademark owner, and the like, and the ranked list can be derived based on this normalization. In some embodiments, the number of times a trademark name/brand is mentioned in corporate data, financial data, news, webpages, and the like, can be combined with the number of times a trademark name/brand has been registered to form the analytical/statistical data.

The application 108C is configured to access and retrieve trademark records and/or data elements from the indexes in the data store 362 via an application service interface 380 and the search engine 364, and to access and retrieve data records and/or data elements from other disparate data sources. In exemplary embodiments, the software application can be implemented as a client-side application or a server-side application that can be utilized by a user to generate one or more search requests. For example, a user can input one or more search terms corresponding to an entity (e.g., an entity name or ticker symbol), and the application can generate a search request that can be transmitted to the search engine 364. The search engine 364 can normalize the search terms (e.g., normalize the entity name) and can look-up an identifier associated with the search term (e.g., via an embodiment of the extraction engine 120a). Once the identifier is obtained, the search engine can determine whether a parent identifier exists that is associated with the identifier. If so, the search engine 364 generates a query that includes the parent identifier and queries the indexes maintained by the data store 362 for trademark records including the parent identifier. If not, the search engine 364 generates a query using the identifier and queries the indexes maintained by the data store 362 for trademark records including the identifier. In either case, the search engine can retrieve a subset of trademark records including the search identifier and/or can retrieve analytical and/or statistic data previously generated by the analytics engine 366 for the subset of trademark records.

In exemplary embodiments, the search engine 360 can return a ranked list of trademarked names/brands stored in the indexes that correspond to the entity included in the search request. For each trademark included in the ranked list, the application can automatically generate queries including the trademarks and can submit the queries to a news data server 140b (a data source), e.g., via an application-program interface 382, to retrieve links to news articles associated with the trademarks as suggested data that may be of interest to the user. The application can generate one or more links between the trademarks and the news articles corresponding to the trademarks. In exemplary embodiments, the application can generate a graphical user interface for displaying the ranked list of trademarks and the news articles for any one of the trademarks simultaneously within the graphical user interface. To view links to news related to a given trademark, the user can select a link associated with the trademark and the graphical user interface can be update to display the news for the trademark.

Figure 5:
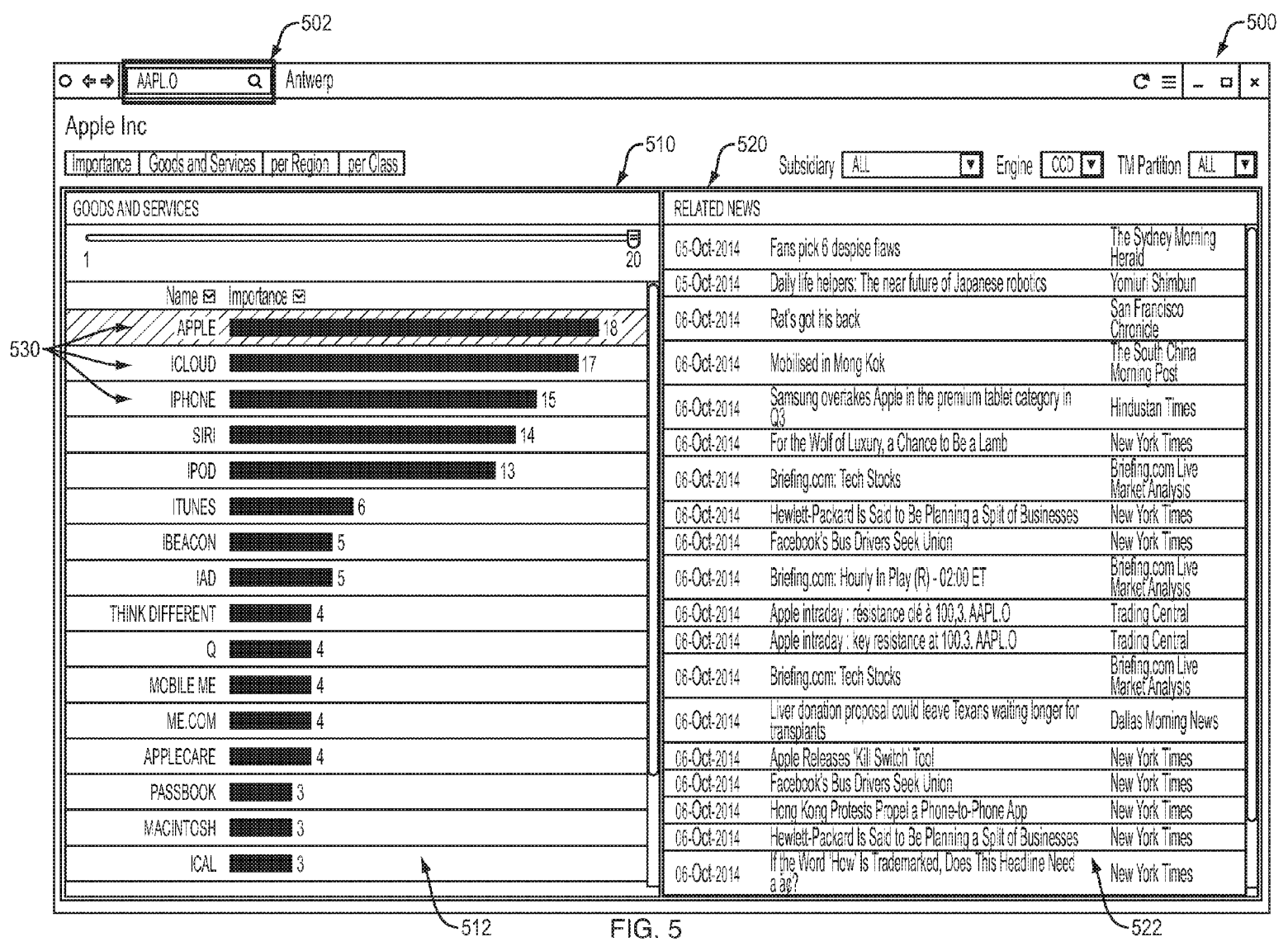

FIG. 5 illustrate an example graphical user interface 500 that can be rendered on a display in accordance with exemplary embodiments of the present disclosure. As shown in FIG. 5, the graphical user interface 500 can include one or more tabs 502 to navigate to different views of data associated with the trademarks returned in response to a search request that can be displayed to allow a user leverage combinatorial business intelligence derived from the trademark records of a given company and/or one or more other source of information related to the given company.

As one example, a view in a graphical user interface that is directed to brand importance can be provided. In some embodiments, the brand importance view can be combined or integrated view that includes a list the most important trademark names/brands for a given company along with recent new about the names/brands.

As another example, a view in a graphical user interface that is directed to the class breakdown of trademarks owned by a given company can be provided. In some embodiments, the class breakdown view can include one or more charts showing the most prominent sector classes in the trademark portfolio of a given company.

As yet another example, a view in a graphical user interface that is directed to a geographical breakdown of trademarked names/brands owned by a given company can be provided. In some embodiments, the geographic breakdown view can include a heat map with filing activity per country.

As still another example, a view in a graphical user interface that is directed to the goods/services associated with trademarks owned by a given company can be provided. In some embodiments, the goods/services view can include a "tag chart" including the most common terms included in the free text of trademarks owned by a given company (e.g., in the data fields including descriptions of the goods/services).

In the present example, in the most important brand view, the user provided the ticker symbol "APPLO" in a data entry field 504 of the graphical user interface 500 and embodiments of the environments described herein returned the trademarks names/brands 512 owned by Apple, Inc. in a ranked order of importance in a display area 510 based on one or more ranking algorithms, such as one or more algorithms described herein.

As described herein, based on the returned trademarks/brands, links 522 to news associated with the trademarks/brands can be displayed in a display area 520 of the graphical user interface 500 to suggest data to the user. One or more selectable links 530 can be embedded in the ranked list of trademarks/brands. For example, each row can form one of the links. The user can select the links to navigate to links for news articles corresponding to the trademark name/brand associated with the selected link. In exemplary embodiments, the links to news corresponding to the highest ranked trademark name/brand can be displayed in the display area 520 by default. The links to the news articles can be selected to retrieve the new articles from the a news database server and to render the news article on a display and/or save the data records to a storage device.

Figure 6:
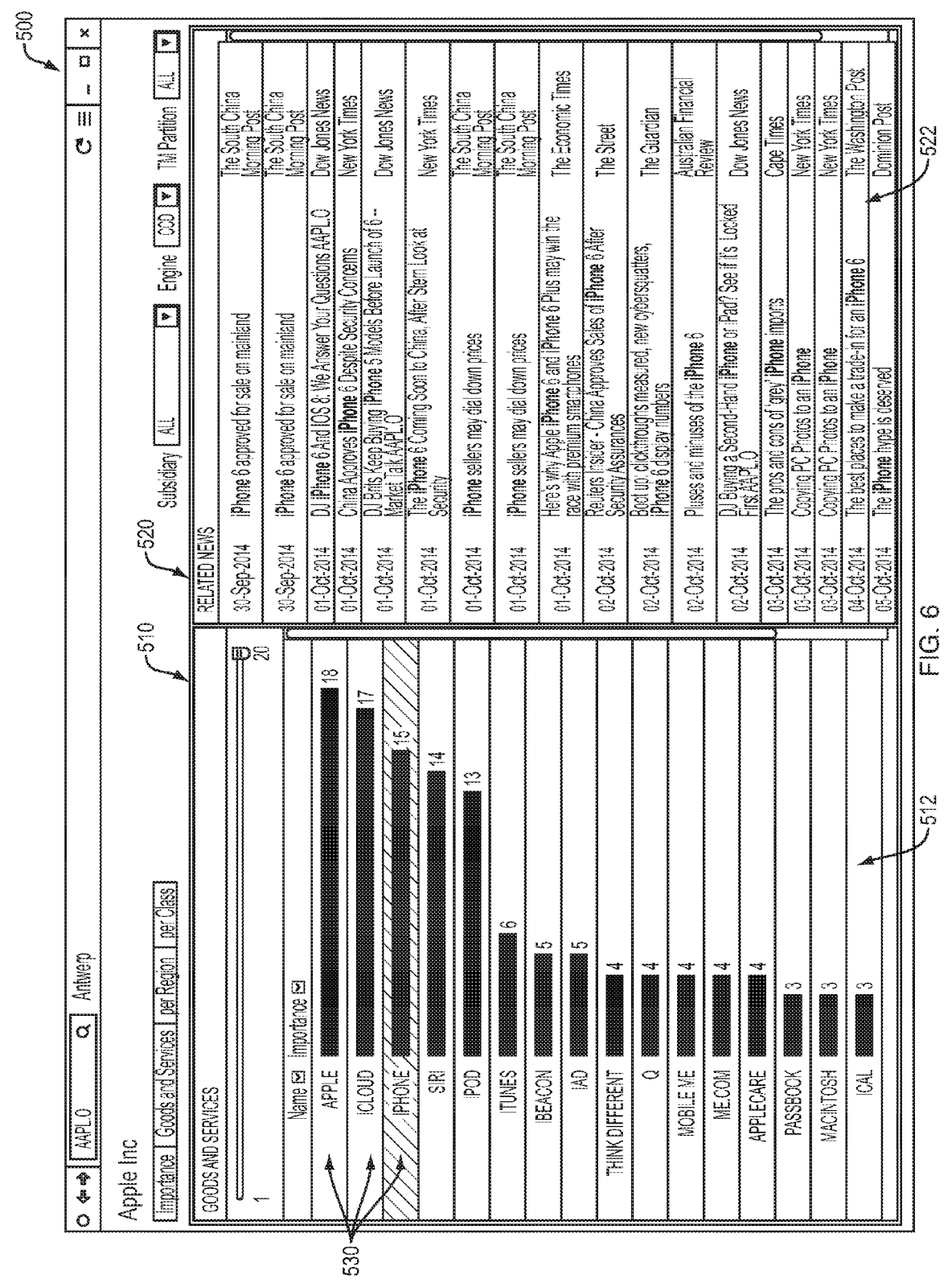

When a user selects one of the links 530 associated with another one of the trademarks/brands, the display area 520 of the graphical user interface 500 can be updated automatically such that the graphical user interface 500 renders links to news associated with the trademark name/brand associated with the selected link. For example, FIG. 6 illustrates the graphical user interface 500 after a link associated with the trademark name/brand "IPHONE" is selected by the user. As shown in FIG. 6, the links to the news article in the display area 520 have been updated to correspond to the trademark name/brand IPHONE.

Figure 7:
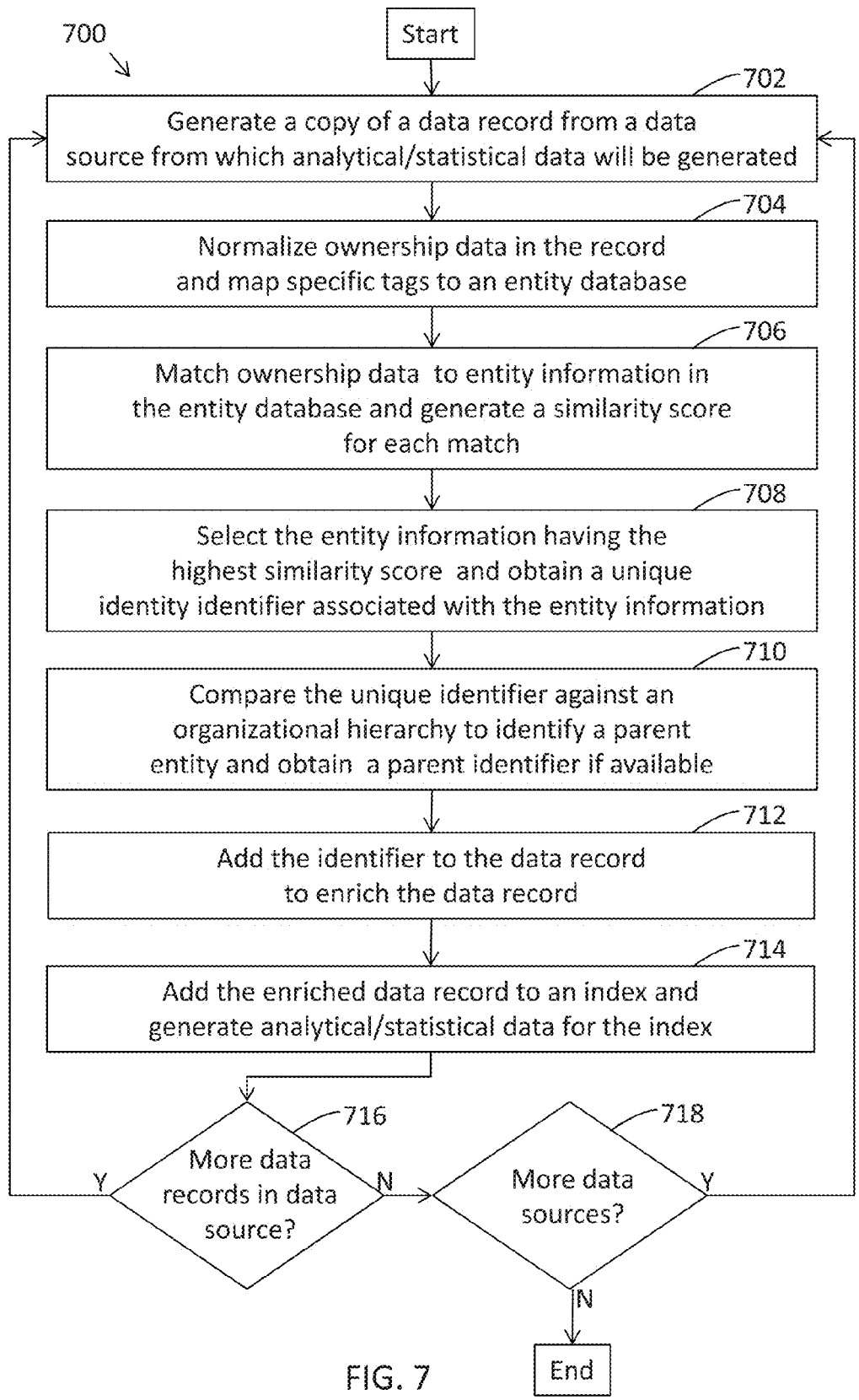
FIG. 7 is a flowchart illustrating an exemplary process for generating enriched data records for enhanced query and search processing with reference to FIG. 3.

FIG. 7 is a flowchart illustrating an exemplary process 700 for generating one or more indexes associated with trademark records extracted from trademark databases with reference to FIG. 3. At step 702, a copy of each trademark record includes in a trademark database maintained by a trademark issuing body (e.g., a government or administrative entity). At step 704, the ownership information included in the trademark records is normalized and tags in the trademark records are mapped to the entity database. At step 706, the ownership information in each trademark record is matched to corresponding entity information in the entity database and a similarity score is generated for each possible match. At step 708, the entity information in the entity database having the highest similarity score is selected and a unique entity identifier for the entity included in the ownership information in the trademark record is obtained from the entity database. At step 710, the unique entity identifier is compared against an organizational hierarchy to determine whether a parent entity associated with the entity exists, and if so, a unique organizational identifier is obtained from the organizational hierarchy. If not, the unique entity identify can be used. At step 712, the identifier for the entity (e.g., the entity identifier or the organizational identifier) is added to the trademark record to form an enriched trademark record. At step 714, the enriched trademark records is added to an index of enriched trademark records and analytical/statistical data is generated for the index including, for example, a ranked list of trademarked names/brands based on entities that owns the trademarks, classes of goods/services identified for the trademarks, and the like. At step 716, the process 700 can determine if there are more trademark records in the current trademark database. If so, the process 700 continues at step 702 by processing the next trademark record in the trademark database. If not, the process 700 continues to step 716. At step 716, the process 700 determines whether there are additional trademark databases to be processed. If so, the process continues at step 702 by processing the first trademark record in the next trademark database. If not, the process 700 ends.

Figure 8:
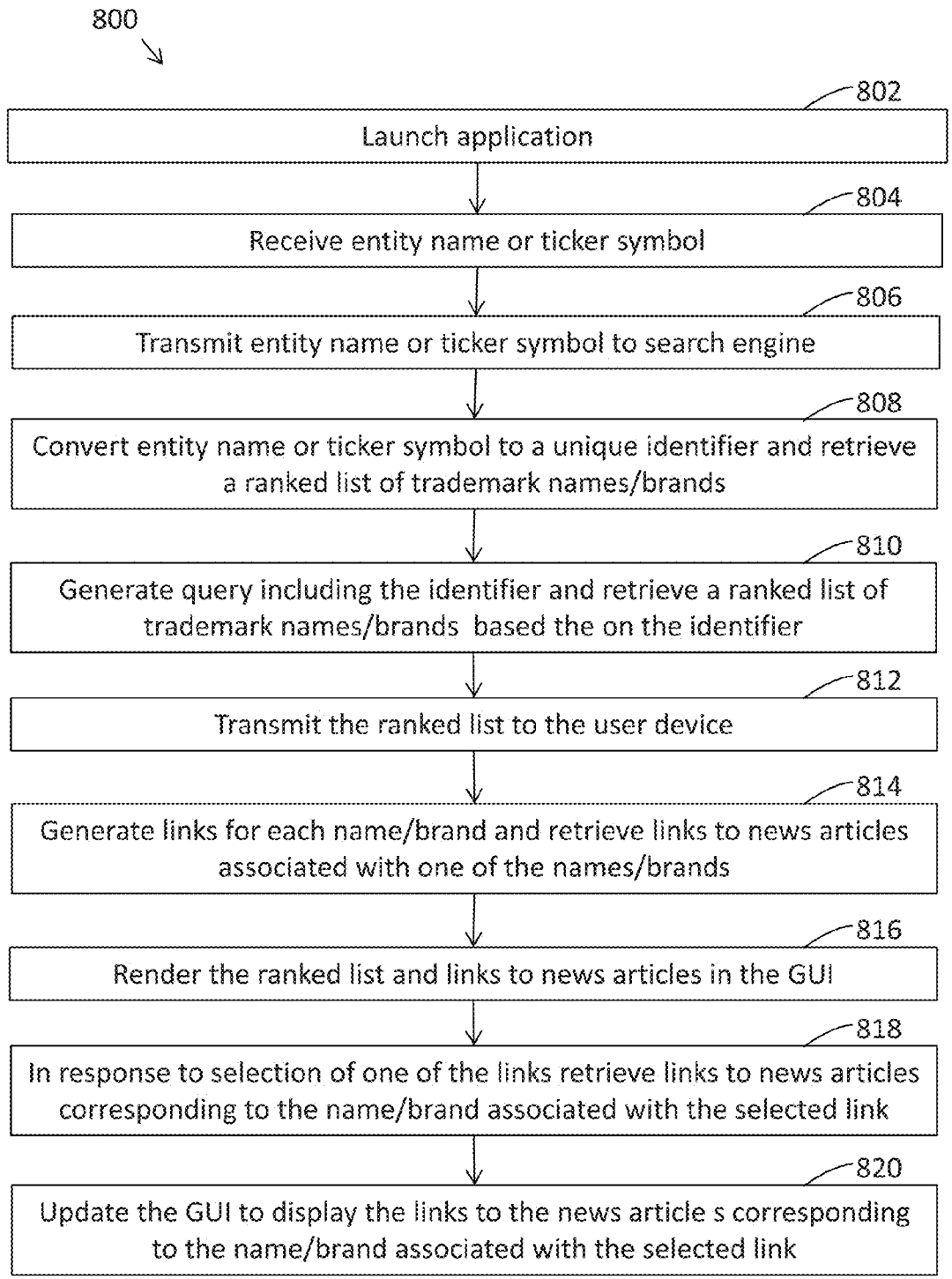
FIG. 8 is a flowchart illustrating an exemplary process for implementing enhanced query and search processing with reference to FIG. 3.

FIG. 8 is flowchart illustrating an exemplary process 800 of performing a search with reference to FIG. 3. At step 802, the user device 102 can launch the application 108C to render a graphical user interface on a display of the user device. At step 804, the application 108C can be executed by the user device to receive an entity name or stock ticker symbol from a user via a data entry field in the graphical user interface. In response to submission of the request to perform a search based on the entered entity name or stock symbol, the application 108C can control the user device 102 to transmit the search terms to the search engine 364 being executed by the server(s) 104 at step 806. At step 808, the search engine 364 converts the entity name or stock ticker symbol into a unique identifier identifying not only the specific entity corresponding to the entity name or stock ticker, but also identifying other entities in the organizational hierarchy associated with the entity name or stock ticker symbol (e.g., subsidiaries and parent companies). At step 810, the unique identifier is provided to the query generator, which generates a query including the unique identifier and retrieves from the data store 362, a ranked order of trademarked names/brands included in the trademark records corresponding to trademarks owned by the entities in the organizational hierarchy associated with the unique identifier.

At step 812, the search engine 364 controls the server(s) 104 to transmit the ranked order of trademarked names/brands to the user device 102. At step 814, the application 108C, generates a link for each of the trademarked names/brands in the ranked trademarked names/brands, and automatically generates a query including at least one of the trademarked names/brands to retrieve links to news articles within which the trademark name/brand is mentioned. For example, by default, the application 108C can be programmed to automatically retrieve links to news articles for the highest ranked trademark name/brand. At step 816, the application can be programmed to render the ranked order of trademarked names/brands in a first display area of the graphical user interface and to render the links new articles associated with the highest ranking trademark name/brand in a second display area of the graphical user interface. At step 818, in response to selection of a link associated with another trademark name/brand in the ranked order of trademarked names/brands, the application can generate a query including the trademark name/brand associated with the link and can retrieve links to news articles from the news database server. At step 820, the application can update the second display area of the graphical user interface to display the links to the news articles associated with trademark name/brand corresponding to the selected link.

In some embodiments, the application can be configured to control the user device 102 to query the news database server for each trademark name/brand identified in the ranked order of trademarked names/brands upon receipt of the ranked list to store a set of links to news articles associated with the trademarked names/brands. The links generated by the application can be selected to navigate to subsets of the links to news articles in the second display area. For example, in response to selection of a link associated with a trademark name/brand, the application can identify the subset of links to news articles corresponding to the trademark name/brand and can display the links in the second display area of the graphical user interface.

Figure 9:
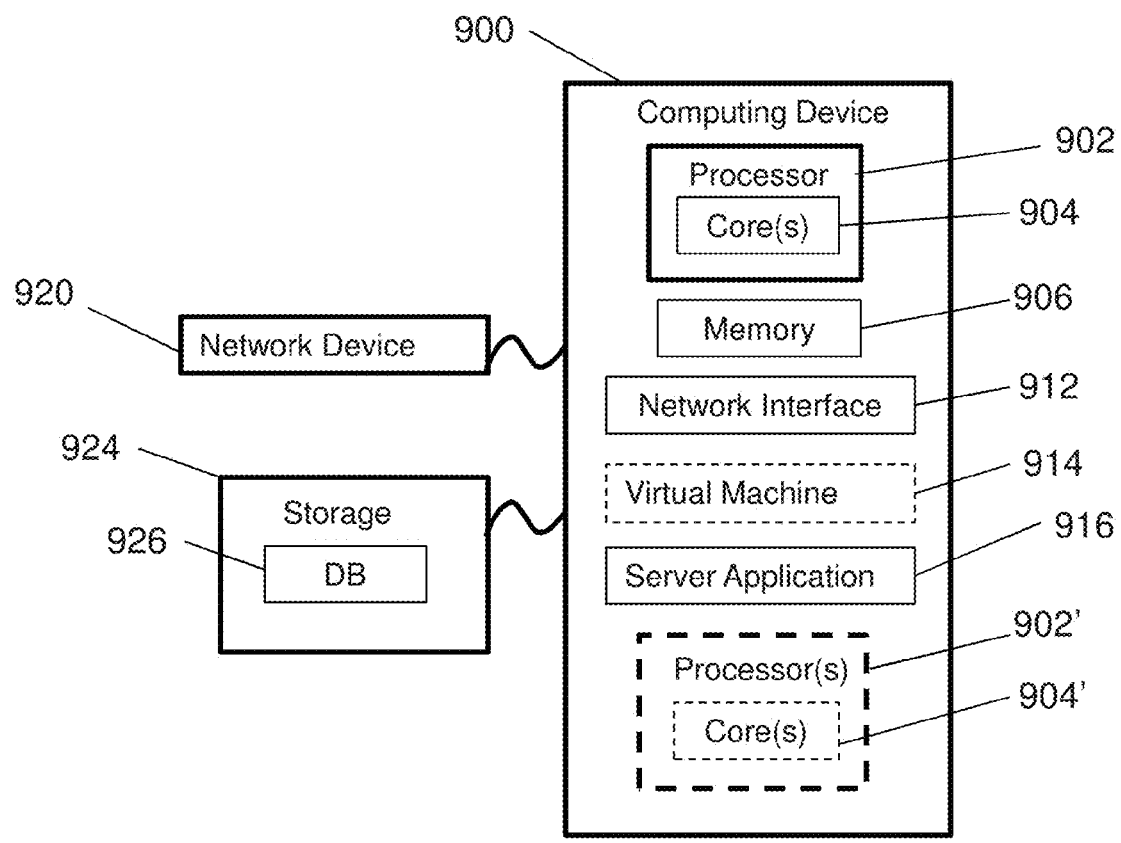
FIG. 9 is an exemplary computing environment for an example server in accordance with exemplary embodiments.

FIG. 9 is a block diagram of an exemplary computing device 900 for implementing one or more of the servers in accordance with embodiments of the present disclosure. In the present embodiment, the computing device 900 is configured as a server that is programmed and/or configured to execute one of more of the operations and/or functions for embodiments of the environment described herein (e.g., environments 100A, 100B, and 100C) and to facilitate communication with the user devices described herein (e.g., user device(s) 102). The computing device 900 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 906 included in the computing device 900 may store computer-readable and computer-executable instructions or software for implementing exemplary embodiments of the components/modules or portions thereof described herein as being implemented, for example, by the server(s) 104 and server(s) 106. The computing device 900 also includes configurable and/or programmable processor 902 and associated core 904, and optionally, one or more additional configurable and/or programmable processor(s) 902' and associated core(s) 904' (for example, in the case of computer systems having multiple processors/cores), for executing computer-readable and computer-executable instructions or software stored in the memory 906 and other programs for controlling system hardware. Processor 902 and processor(s) 902' may each be a single core processor or multiple core (904 and 904') processor.

Virtualization may be employed in the computing device 900 so that infrastructure and resources in the computing device may be shared dynamically. One or more virtual machines 914 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

The computing device 900 may also include one or more storage devices 924, such as a hard-drive, CD-ROM, mass storage flash drive, or other computer readable media, for storing data and computer-readable instructions and/or software that can be executed by the processing device 902 to implement exemplary embodiments of the components/modules described herein with reference to the server(s) 104 and 106. The storage device 924 can also store one or more databases or data sources 926 corresponding to one or more of the databases or data sources described herein.

The computing device 900 can include a network interface 912 configured to interface via one or more network devices 922 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections (including via cellular base stations), controller area network (CAN), or some combination of any or all of the above. The network interface 912 may include a built-in network adapter, network interface card, PCMCIA network card, card bus network adapter, wireless network adapter, USB network adapter, modem or any other device suitable for interfacing the computing device 900 to any type of network capable of communication and performing the operations described herein. While the computing device 900 depicted in FIG. 9 is implemented as a server, exemplary embodiments of the computing device 900 can be any computer system, such as a workstation, desktop computer or other form of computing or telecommunications device that is capable of communication with other devices either by wireless communication or wired communication and that has sufficient processor power and memory capacity to perform the operations described herein.

The computing device 900 may run any server application 916, such as any of the versions of server applications including any Unix-based server applications, Linux-based server application, any proprietary server applications, or any other server applications capable of running on the computing device 900 and performing the operations described herein. An example of a server application that can run on the computing device includes the Apache server application.

Figure 10:
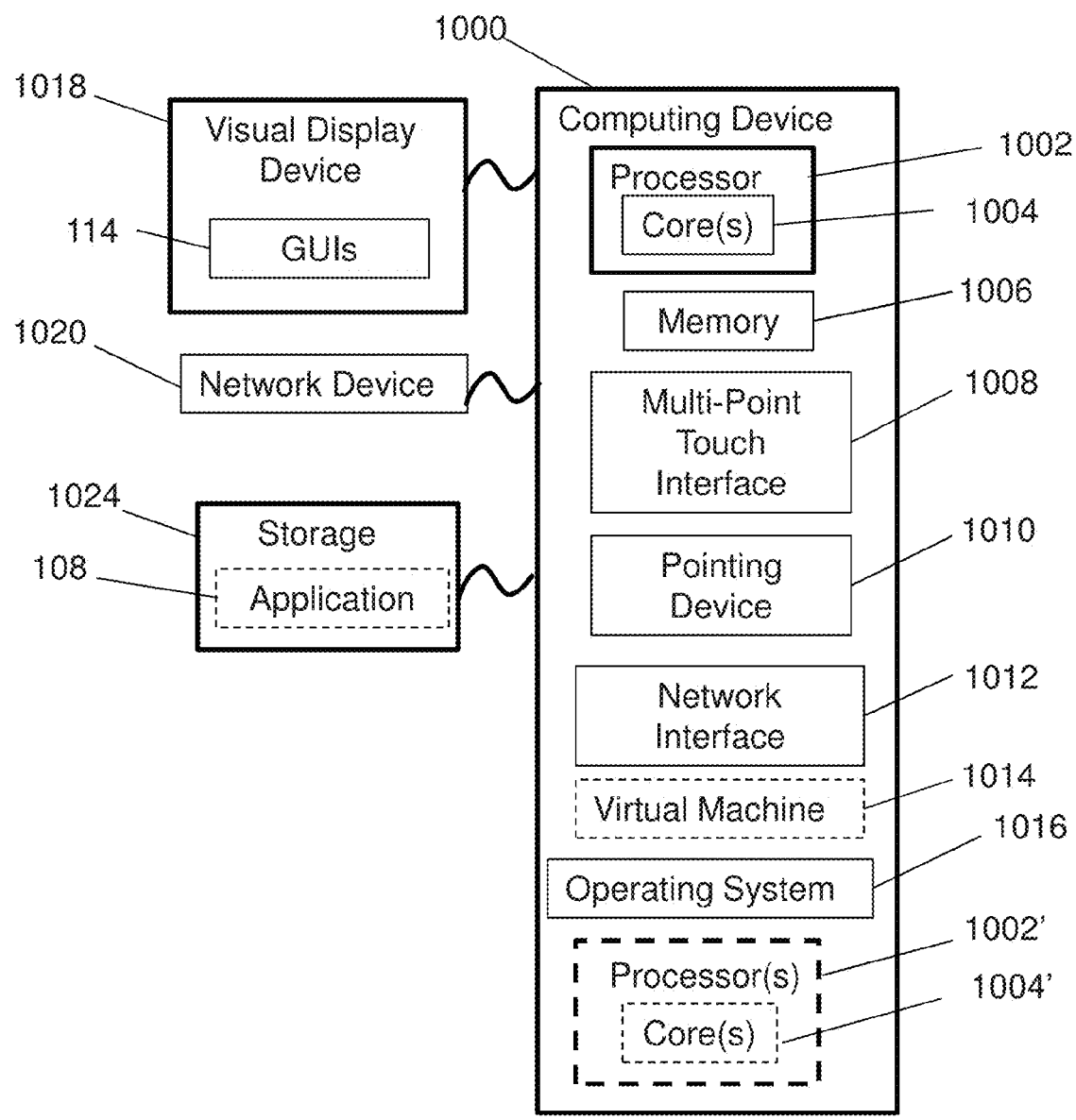
FIG. 10 is an exemplary computing environment for an example user device in accordance with exemplary embodiments.

FIG. 10 is a block diagram of an exemplary computing device 1000 for implementing one or more of the user devices in accordance with embodiments of the present disclosure. In the present embodiment, the computing device 1000 is configured as a client-side device that is programmed and/or configured to execute one of more of the operations and/or functions for embodiments of the environment described herein (e.g., environments 100A, 100B, and 100C) and to facilitate communication with the servers described herein (e.g., servers 104 and 106). The computing device 1000 includes one or more non-transitory computer-readable media for storing one or more computer-executable instructions or software for implementing exemplary embodiments of the application described herein (e.g., embodiments of the application 108A, 108B, and 108C). The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store computer-readable and computer-executable instructions, code or software for implementing exemplary embodiments of the environments 100 or portions thereof. The computing device 1000 also includes configurable and/or programmable processor 1002 and associated core 1004, and optionally, one or more additional configurable and/or programmable processor(s) 1002' and associated core(s) 1004' (for example, in the case of computer systems having multiple processors/cores), for executing computer-readable and computer-executable instructions, code, or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, MRAM, EDO RAM, and the like. Memory 1006 may include other types of memory as well, or combinations thereof.

A user may interact with the computing device 1000 through a visual display device 1018, such as a computer monitor, which may be operatively coupled, indirectly or directly, to the computing device 1000 to display one or more of graphical user interfaces that can be provided in accordance with exemplary embodiments. The computing device 1000 may include other I/O devices for receiving input from a user, for example, a keyboard or any suitable multi-point touch interface 1008, and a pointing device 1010 (e.g., a mouse). The keyboard 1008 and the pointing device 1010 may be coupled to the visual display device 1018. The computing device 1000 may include other suitable I/O peripherals.

The computing device 1000 may also include or be operatively coupled to one or more storage devices 1024, such as a hard-drive, CD-ROM, or other computer readable media, for storing data and computer-readable instructions, executable code and/or software that implement exemplary embodiments of the application or portions thereof as well as associated processes described herein. For example, the computing device 1000 can execute the instructions, code, and/or software to provide the GUIs described herein and/or to perform the steps of the processes described herein.

The computing device 1000 can include a network interface 1012 configured to interface via one or more network devices 1020 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the processes and/or operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the processes and/or operations described herein. In exemplary embodiments, the operating system 1016 may be run in native mode or emulated mode.

In an exemplary embodiment, the operating system 1016 may be run on one or more cloud machine instances.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A computer-implemented method comprising:
   receiving, at a server, input pertaining to an entity from a user device;
   normalizing, at the server, the input;
   transforming, at the server, the normalized input into an entity identifier associated with the entity;
   generating a query based on the entity identifier;
   obtaining from a database a ranked list of selected trademark names in response to the query including the entity identifier;
   generating, using a news database server, a first set of links to a first set of news articles of the plurality of news stories associated with at least a first one of the trademark names in the ranked list, based on a first one of a set of queries;
   rendering the ranked list of selected trademark names and the first set of links to the first set of news articles associated with the at least first one of the trademark names on a display device through a graphical user interface, each trademark name being embedded with a selectable link to a query from the set of queries associated with news articles from the plurality of retrieved news articles, associated with the respective trademark name;
   rendering the ranked list in a first display area of the graphical user interface;
   rendering the first set of links to the news articles in a second display area of the graphical user interface.

2. The method of claim 1, further comprising:
   in response to selection of a second trademark name embedded with a selectable link, generating using the news database server, a second set of links associated with a second set of news articles; and
   replacing the first set of links with the second set of links on the display device through the graphical user interface.

3. The method of claim 1, wherein generating, using the news database server, the first set of links to a first set of news articles associated with the at least first one of the trademark names in the ranked list is performed in response to an auto-generated query including a highest ranking one of the trademark names in the ranked list.

4. The method of claim 1, wherein selection of one of the links in the first set of links causes the news article to be rendered on the display.

5. The method of claim 1, wherein the entity identifier is further associated with an entity top level organizational identifier using an organizational hierarchy database.

6. The method of claim 1, further comprising generating the ranked list of trademark names based on a quantity of times the entity registered the trademark names, a quantity of times the trademark names are mentioned in the news articles or in another data source.

7. The method of claim 1, further comprising generating the ranked list of trademark names based on based on a quantity of times the entity registered the trademark names normalized by additional data associated with the entity.

8. A method of searching disparate data sources in a networked environment, the method comprising:
   normalizing, at the server, a received search request;
   transforming, at the server, the normalized search request into a unique identifier;
   generating a query based on the unique identifier;
   retrieving, via a communications network, analytical data for a first set of data records from a first data source based on the query including the unique identifier;
   identifying at least a first data element in the first set from which the analytical data is generated;
   generating, via the communications network or another communications network, links to a second set of data records from a second data source based on a set of queries including the at least first data element, the first and second data sources being disparate sources;
   rendering the analytical data for the first set of data records from the first data source in a first display area of a displayed graphical user interface, each data element of the first set of data records being embedded with a selectable link to a query from the set of queries, associated with a subset of the second set of the data records, associated with the respective data record; and
   rendering the links to a first subset of the second set of data records associated with a first data record from the first set of data records, from the second data source in a second display area of the displayed graphical user interface.

9. The method of claim 8, wherein identifying the at least first data element comprises identifying a plurality of data elements in the first set from which the analytical data is generated.

10. The method of claim 9, further comprising:
   in response to selection of at least a second data element embedded with a selectable link to a query from the set of queries;
   generating, based on a response to the query by the second data source, links to a third set of data records from the second data source; and
   replacing the links to the second set data records in the second display area with the links to the third set of data records.

11. The method of claim 9, wherein the analytical data corresponds to a ranked list of data elements included in the first set of data records.

12. The method of claim 9, wherein the first set of data records are associated with a first domain and the second set of data records are associated with a second domain.

13. A system comprising:
   a first database server storing analytical data associated with the trademark records;
   a news database server storing new articles; and
   an entity database server storing entity identifiers;
   wherein the first database server receives input from a user device pertaining to an entity, normalize the input, transform the normalized input into an entity identifier associated with the entity, generate a query based on the entity identifier; and obtains from the first database server a ranked list of selected trademark names in response to the the query including the entity identifier,
   wherein the news database server generates a first set of links to a first set of news articles of the plurality of news articles associated with at least a first one of the trademark names in the ranked list, based on a first one of the set of queries, the ranked list of selected trademark names and the first set of links to the first set of news articles associated with the at least a first one of the trademark names being transmitted to and displayed by a user device through a graphical user interface, each trademark name being embedded with a selectable link to a query from a set of queries, associated with news articles from the plurality of retrieved news articles, associated with the respective trademark name;
   wherein the ranked list of selected trademark names are rendered on a first display are of the graphical user interface and the first set of the first set of links to the news articles are rendered in a second display area of the graphical user interface.

14. The system of claim 13, wherein the news database server generates a second set of links associated with a second set of news articles.

15. The system of claim 14, wherein the second set of links is transmitted to and displayed by the user device in place of the first set of links.

16. The system of claim 13, wherein the first set of links to a first set of news articles is generated for a highest ranking one of the trademark names in the ranked list.

17. The system of claim 13, wherein a rank of the selected trademark names in the ranked list is determined based on at least one of a quantity of times the entity registered each of the trademark names, a quantity of times each of the selected trademark names are mentioned in the news articles or in another data source.

18. The system of claim 13, wherein a rank of the selected trademark names in the ranked list of trademark names is based on a quantity of times the entity registered the trademark names normalized by additional data associated with the entity.

19. A method comprising:
   providing a downloadable client-side application over a communication network for installation and execution by a user device;
   in response to launching the client-side application, rendering a graphical user interface on a display of the user device;
   transmitting, by the user device at the instruction of the client-side application, a search request including a search term over a communications network to a first server in communication with a first data source, the first server normalizing the search term, transforming the normalized input into an unique identifier, generating a query based on the unique identifier; executing the query including the unique identifier on the first data source;
   receiving, from the first server, analytical data associated with a first set of data records including a plurality of data elements stored by the first data source;
   transmitting, by the user device at the instruction of the client-side application, a query from a set of queries to a second server in communication with a second data source, the query including a first data element included in the first set of data records that was utilized to generate the analytical data;

receiving, from the second server, links to a first subset of the second set of data records;

embedding links in each data element of the first set of data records, each link associated to a query from the set of queries associated with the respective data element;

displaying the analytical data associated with the first set of data records and the links to the first subset of the second set of data records simultaneously in the graphical user interface rendered on the display, wherein the first set of data records are displayed on a first area of the graphical user interface and the links to the first subset of the second set of data records are displayed on a second area of the graphical user interface.

20. The method of claim 19, further comprising:

in response to selection of a second data element embedded with a link to a further query, transmitting, by the user device at the instruction of the application, further query to the second server, the query including the second data element included in the first set of data records and which was utilized to generate the analytical data;

receiving, from the second server, links to a third set of data records; and replacing the link to the second set of data records with the links to the third set of data records in the graphical user interface.

\* \* \* \* \*